(12) United States Patent
Okada et al.

(10) Patent No.: US 8,091,236 B2
(45) Date of Patent: Jan. 10, 2012

(54) MANUFACTURING METHOD FOR TOOTHED POWER TRANSMISSION MEMBER HAVING OIL RESERVOIR AND TOOTHED POWER TRANSMISSION MEMBER MANUFACTURED BY THIS MANUFACTURING METHOD

(75) Inventors: Shinji Okada, Fujisawa (JP); Yasushi Watanabe, Maebashi (JP); Naoki Hara, Maebashi (JP); Seiichi Moriyama, Maebashi (JP); Hideki Hidaka, Maebashi (JP)

(73) Assignee: NSK Ltd., Tokyo (JP)

( * ) Notice: Subject to any disclaimer, the term of this patent is extended or adjusted under 35 U.S.C. 154(b) by 1260 days.

(21) Appl. No.: 11/720,410

(22) PCT Filed: Nov. 29, 2005

(86) PCT No.: PCT/JP2005/021917
§ 371 (c)(1),
(2), (4) Date: May 29, 2007

(87) PCT Pub. No.: WO2006/057414
PCT Pub. Date: Jun. 1, 2006

(65) Prior Publication Data
US 2008/0010830 A1  Jan. 17, 2008

(30) Foreign Application Priority Data

Nov. 29, 2004 (JP) .................................. 2004-345035
Jan. 26, 2005 (JP) .................................. 2005-017935
Nov. 14, 2005 (JP) .................................. 2005-329232

(51) Int. Cl.
*B21K 1/30* (2006.01)
*F16H 19/08* (2006.01)

(52) U.S. Cl. .......................................... 29/893.3; 74/29

(58) Field of Classification Search ................. 29/893.3; 74/29, 484 R, 640; *F16H 55/17, 48/20; B21K 1/30; B21J 13/02*
See application file for complete search history.

(56) References Cited

FOREIGN PATENT DOCUMENTS

| JP | 52-35753 | | 3/1977 |
|---|---|---|---|
| JP | 56-59030 | A | 5/1981 |
| JP | 58008931 | B2 | 2/1983 |
| JP | 60-110172 | U | 7/1985 |
| JP | 7-308729 | A | 11/1995 |
| JP | 7-310807 | A | 11/1995 |
| JP | 8-226526 | A | 9/1996 |
| JP | 8-226536 | A | 9/1996 |
| JP | 10-47457 | A | 2/1998 |
| JP | 11-10274 | A | 1/1999 |

(Continued)

OTHER PUBLICATIONS

Japanese Office Action issued for Application No. 2004-345035, dated Feb. 9, 2010. Microfilm of the specification and drawings annexed to the request of Japanese Utility Model Application No. 199783/1983 (Laid-open No. 110172/1985) (Isuzu Motors Ltd.), Jul. 26, 1985, Description; p. 4, lines 6 to 12, (Family: none).
Japanese Office Action dated Jun. 23, 2009.

*Primary Examiner* — John C Hong
(74) *Attorney, Agent, or Firm* — Sughrue Mion, PLLC

(57) ABSTRACT

A method of manufacturing a toothed power transmission member having an oil reservoir according to the present invention includes steps of forming primitive concave portion, which form a basis for the oil reservoir, on a surface of a toothed power transmission member work, and forming a tooth surface by processing the toothed power transmission member work such that a trace of the primitive concave portion is left on the toothed power transmission member thereby to form a toothed power transmission member. The trace of the primitive concave portion, which is formed in the step of forming a tooth surface and left on the toothed power transmission member, serves as the oil reservoir.

15 Claims, 29 Drawing Sheets

FOREIGN PATENT DOCUMENTS

| | | | |
|---|---|---|---|
| JP | 11132305 A | * | 5/1999 |
| JP | 2001-205385 A | | 7/2001 |
| JP | 2002-79349 A | | 3/2002 |
| JP | 2002178091 A | | 6/2002 |
| JP | 2003-13986 A | | 1/2003 |
| JP | 2003025039 A | | 1/2003 |
| JP | 2003-54421 A | | 2/2003 |
| JP | 2003-207031 A | | 7/2003 |
| JP | 2003-266144 A | | 9/2003 |
| JP | 2004-155223 A | | 6/2004 |
| JP | 2004-324863 A | | 11/2004 |

* cited by examiner

FIG. 7
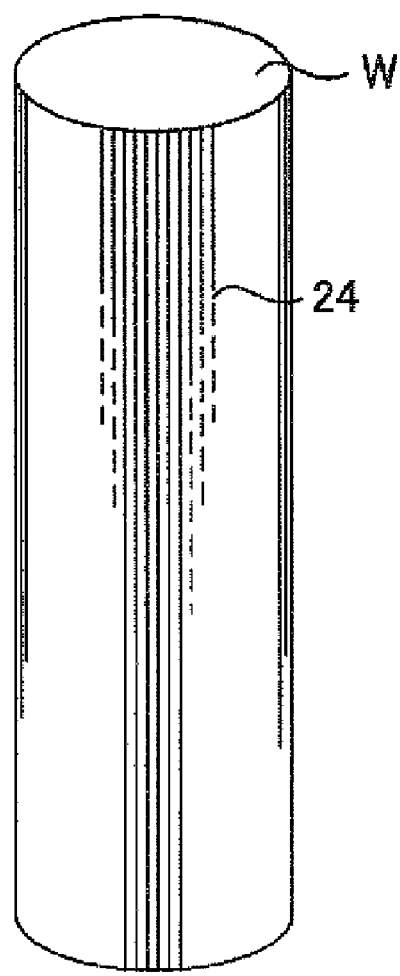
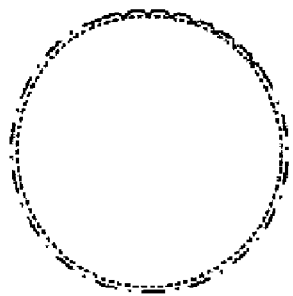

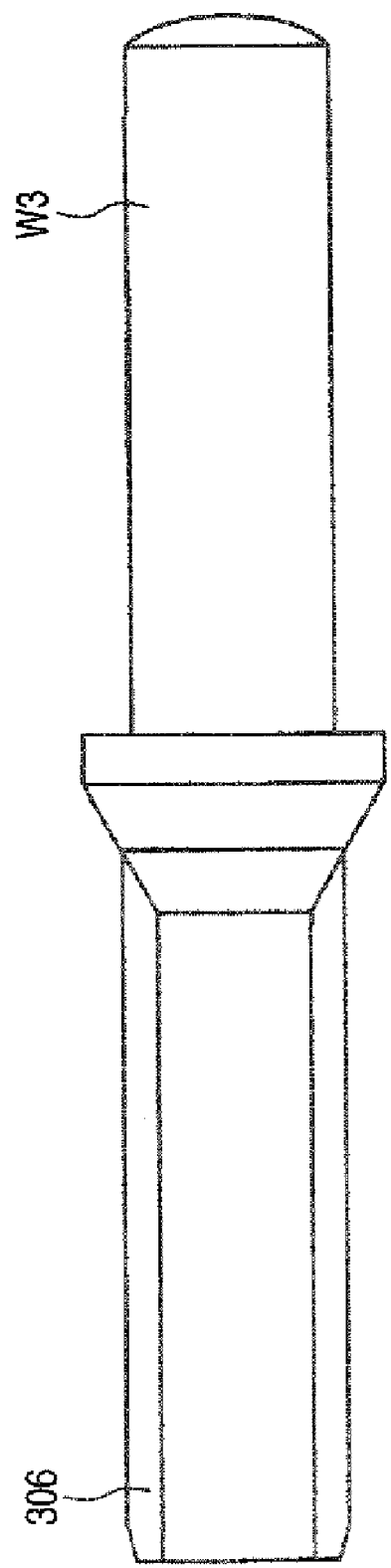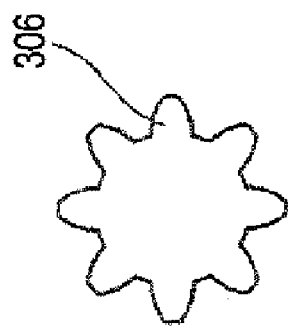
FIG. 22(a)
FIG. 22(b)

MANUFACTURING METHOD FOR TOOTHED POWER TRANSMISSION MEMBER HAVING OIL RESERVOIR AND TOOTHED POWER TRANSMISSION MEMBER MANUFACTURED BY THIS MANUFACTURING METHOD

TECHNICAL FIELD

The present invention relates to a manufacturing method for a toothed power transmission member having an oil reservoir, and to a product manufactured by the manufacturing method. More particularly, the present invention relates to an art of forming an oil reservoir for supplying a lubricant to a tooth surface engaging with a counterpart toothed power transmission member, the oil reservoir being formed from a pond-like concave portion or a groove-like portion formed on a tooth surface of the toothed power transmission member.

Incidentally, in the present descriptions, the "lubricant" is not limited to a lubricating oil and generically designates substances, suck as a grease, having a lubricating action similar to that of the lubricating oil. Such substance is stored in the oil reservoir.

BACKGROUND ART

A toothed power transmission member, such a member suitably being used in a gear, a spline, a screw, or a ball screw, is a machine part adapted to transmit a power to a toothed counter part power transmission member. In the toothed power transmission member, large surface pressure causes not only the contact between tooth surfaces but also a relative sliding therebetween. Accordingly, it is necessary for preventing the wear of the tooth surfaces and the power loss therebetween and for achieving a smooth power transmission therebetween that a lubricating oil (or a lubricating agents is always present on a tooth surface (or an engaging surface) portion.

Several methods are known as a method for supplying a lubricant to a tooth surface. One of the methods is to form a single or a plurality of oil reservoirs on a tooth surface, and to naturally diffuse the lubricant on the tooth surface from the oil reservoir. Examples are shown in Patent Document 1 to Patent Document 3. Such lubricating method is traditionally contrived and has advantages in that the principle thereof is simple, and that the interval of the maintenance, such as the supply of lubricant, can be lengthened. However, a low-cost processing method which can be used in mass-production is not realized since the processing of a groove on a tooth surface having a complex curved surface is so difficult.

In a case where oil reservoirs are formed in toothed power transmission members, such as pinions, racks, and screw shafts, oil reservoirs are formed on surfaces of, for example, involute teeth or tooth threads of such machine elements serving as transfer mechanisms. The processing of a groove in a surface of a tooth can be achieved by performing, after processing the tooth by means of a tooth cutting tool such as a hob, cutting, laser-processing, and electro-discharge processing. However, as the number of grooves increases, the processing of the grooves in addition to the creation of a tooth becomes more difficult, so that the processing thereof cannot efficiently be achieved.

Next, a steering apparatus is described below as an example of an apparatus that needs a toothed power transmission member.

In a steering apparatus, a telescopic shaft, which includes a male spline shaft and a female spline shaft that are fitted so as to be unable to rotate and as to be relatively slidable, is incorporated into an intermediate shaft or a steering shaft. Such telescopic shafts are disclosed in Patent Document B, Patent Document 9, Patent Document 10, and Patent Document 11.

FIGS. 33 to 35 illustrate a conventional telescopic shaft. FIG. 33 is a front view illustrating a conventional steering apparatus having a telescopic shaft. FIG. 34 illustrates a male spline shaft constituting an intermediate shaft shown in FIG. 33, wherein (1) illustrates a front view of the male spline shaft, and (2) is a cross-sectional view taken along line A-A shown in (1). FIG. 35 illustrates a female spline shaft constituting the intermediate shaft shown in FIG. 33, wherein (1) is a longitudinal cross-sectional view of the female spline shaft, and (2) is a right side view of the female spline shaft shown in (1).

An intermediate shaft 12 and a steering shaft 13, which serve as telescopic shafts, are incorporated into a steering apparatus shown in FIG. 33. When a cardan joint 17 is fastened to a pinion shaft 16 engaging with a rack shaft 15 of a steering gear 14, the intermediate shaft 12 is temporarily contracted and is then fitted to the pinion shaft 16, thereby being fastened thereto. Thus, the intermediate shaft 12 needs a telescopic function. Also, the intermediate shaft 12 is required to have capabilities of absorbing the axial displacement and vibrations occurring while a vehicle is running, and of preventing the displacement and vibrations from being transmitted to a steering wheel 18. Because of necessity to shift the position of the steering wheel 18 according to the physique and the driving posture of a driver, the steering shaft 13 is required to have a function of axially expanding and contracting.

FIG. 34 shows a male spline shaft 121 constituting the intermediate shaft 12. FIG. 35 shows a female spline shaft 122 constituting the intermediate shaft 12. The telescopic shaft constituted by the male spline shaft 121 and the female spline shaft 122 needs to reduce a sliding resistance, which is caused while expanding and contracting, to thereby smoothly be expanded and contracted with a small force. Therefore, as described in Patent Document 8 and FIG. 34(2), the periphery of the tooth surface of the male spline shaft 121 is coated with a resin 123, whose sliding resistance is small. Then, a lubricating agent is applied thereto. Subsequently, the male spline shaft 121 is fitted thereinto to thereby assemble the telescopic shaft, Such a telescopic shaft is iteratively expanded and contracted by simultaneously applying torque thereto while driving the vehicle. Thus, it is necessary to constantly supply a lubricating agent (or lubricating oil) to a contact portion between the tooth surfaces of the male spline and the female spline. As a resolution therefor, the tooth surface of the male spline shaft is coated with resins to thereby form a two layer structure having upper and lower layers, as described in Patent Document 10. Also, a space communicating with the outside is formed in the upper resin layer so that a lubricating agent is stored in this space. However, this conventional member has a drawback in that because a manufacturing process is complex, the manufacturing cost thereof rises.

Also, as described in Patent Document 11, there is a resin-coated sliding spline constructed so that a concave portion is dug to extend in a circumferential direction of the tooth surface of the female spline, and that an oil reservoir corresponding to this concave portion is formed by adjusting the thickness of a resin coating film to be coated on this concave portion. However, this technique is to form a concave portion in the tooth surface of the female spline after the female spline is formed. Thus, it is difficult to form a concave portion having a constant depth along a very uneven tooth surface of the female spline. That is, in a case where the concave portion is processed by cutting, intermittent cutting is performed. Consequently, burrs are produced on the tooth surface of the spline. The elimination of the burrs is time-consuming. Also, the durability of a working tool is lowered. Thus, this technique has a drawback in that the manufacturing cost rises. Also, in a case where a concave portion is processed by plastic working, the shape of apart of the spline, which part surrounds the concave portion, is lost. Thus, this technique has another drawback in that the accuracy of dimension of the tooth surface of the spline is reduced.

Also, there is a method of enhancing the lubricating-agent holding capability according to the ability of the lubricating agent. However, the viscosity of the lubricating agent becomes high. This results in a high expansion/contraction resistance at assembling. Thus, this method has a problem in that the assembling is difficult to achieve.

Generally, a fluid lubrication is intended to reduce the friction of a sliding surface of a machine element, a meshing portion of a gear, and a screwing portion of a screw, to reduce the wear thereof by maintaining the thickness of an oil film, and to dissipate an amount of generated heat. In a case where a machine and an apparatus are operated by maintaining an appropriate thickness of an oil film, the wear of a sliding surface can be considerably reduced. The lifetime of a machine and an apparatus can be elongated. The thickness of an oil film always varies according to change of mechanical conditions, for example, a load and a speed, and to the influence of a used lubricating agent. Therefore, it is too early to see that lubrication requirements are satisfied by simply supplying a lubricating agent.

Especially, in the meshing portion of the gear of a power transmission mechanism, the surface pressure of the gear is high. Thus, change in the surface pressure of the gear has large influence on the formation of an oil film. As is well known, the higher the surface pressure of the gear rises, the smaller the thickness of the oil film becomes. Therefore, when a great load is applied on the tooth surface, a desirable fluid lubrication cannot be maintained. A lubricating mechanism changes from a fluid lubrication to a mixed lubrication by which larger friction occurs. At that time, the friction caused by the contact between a gear tooth and a counterpart gear tooth increases to thereby significantly increase the wear of the tooth surfaces.

It is preferable for suppressing the wear of the teeth of the gear that means for assisting the assurance of the thickness of an oil film is provided. There has been provided the technique of forming an oil reservoir, which holds lubricating oil, in a tooth of a gear of a worm wheel of a worm reducer (see, for example, JP-A-8-226526).

An oil film can immediately be recovered by supplying a lubricating agent, which is stored in the oil reservoir, to a tooth surface even when the tooth surface temporarily runs out of an oil film. Thus, an oil reservoir placed in a region, in which the tooth of a gear of a worm is brought into sliding contact with that of a gear of a worm wheel, can serve to stably form an oil film.

Patent Document 1: JP-A-2004-155223.
Patent Document 2: JP-A-2003-207031
Patent Document 3: JP-A-08-226536
Patent Document 4: JP-A-2002-079349
Patent Document 5: JP-A-11-010274
Patent Document 6: JP-A-07-310807
Patent Document 7: JP-A-07-308729
Patent Document 8: JP-A-2003-054421
Patent Document 9: JP-A-2004-324863
Patent Document 10: JP-A-2003-013986
Patent Document 11: JP-A-56-059030
Patent Document 12: JP-A-8-226526 (page 4, FIGS. 3-5)

DISCLOSURE OF THE INVENTION

Problems that the Invention is to Solve

The present invention is accomplished in view of the aforementioned situation.

Problems that the present invention is to solve are to provide a manufacturing method for a toothed power transmission member having an oil reservoir, whose ability to hold a lubricating agent is enhanced, is suitable for mass production without increasing the manufacturing cost thereof very much, and to provide a toothed power transmission member manufactured by this manufacturing method.

Means for Solving the Problems

The aforementioned problems are solved by the following means.

According to a first aspect of the invention, a method of manufacturing a toothed power transmission member having an oil reservoir, includes steps of:

forming a primitive concave portion, which form a basis for the oil reservoir, on a surface of a toothed power transmission member work; and forming a tooth surface of the toothed power transmission member by processing the toothed power transmission member work such that a trace of the primitive concave portion is left, wherein the trace of the primitive concave portion left on the toothed power transmission member serves as the oil reservoir.

According to a second aspect of the invention, in the method of manufacturing a toothed power transmission member having an oil reservoir as set forth in the first aspect of the invention, the step of forming a primitive concave portion includes a step of forming a primitive concave portion on a cylindrical surface of a bar-like work, and the step of forming a tooth surface includes a step of cold forging in which the bar-like work is pushed into a forging mold having a section whose shape is complementary to that of a desired toothed power transmission member.

According to a third aspect of the invention, in the method of manufacturing a toothed power transmission member having an oil reservoir as set forth in the second aspect of the invention, the primitive concave portion includes a spiral groove formed on the cylindrical surface of the bar-like work so as to form the oil reservoir in grooved shape.

According to a fourth aspect of the invention, in the method of manufacturing a toothed power transmission member having an oil reservoir as set forth in the second aspect of the invention, the primitive concave portion includes a plurality of annular grooves formed on the cylindrical surface of the bar-like work to so as to form the oil reservoirs in grooved shape.

According to a fifth aspect of the invention, in the method of manufacturing a toothed power transmission member having an oil reservoir as set forth in the second aspect of the invention, the primitive concave portion includes a plurality of longitudinal grooves formed along a longitudinal direction on the cylindrical surface of the bar-like work so as to form the oil reservoir in grooved shape.

According to a sixth aspect of the invention, in the method of manufacturing a toothed power transmission member having an oil reservoir as set forth in the second aspect of this invention; the primitive concave portion formed on the cylindrical surface of the bar-like work includes a circular concave part so as to form the oil reservoir in a ponded shape.

According to seventh to ninth aspects of the invention, a gear having a spur tooth or an inclined tooth, a male spline, and a male screw are manufactured by the method of manufacturing the toothed power transmission member having an oil reservoir as set forth in one of the second aspect of the invention, wherein a tooth surface of each has no burrs and is substantially flat between adjacent oil reservoirs According to a tenth aspect of the invention, in the method of manufacturing a toothed power transmission member having an oil reservoir as set forth in the first aspect of the invention, the step of forming a primitive concave portion includes a step of forming a circumferential primitive concave portion in an inner circumferential surface of a hollow cylindrical work, and the step of forming a tooth surface includes a step of forming a female spline by performing plastic working on the inner circumferential surface of the hollow cylindrical work where the primitive concave portion is formed.

According to an eleventh aspect of the invention, in the method of manufacturing a toothed power transmission member having an oil reservoir as set forth in the tenth aspect of the invention, the primitive concave portion includes a spiral groove.

According to a twelfth aspect of the invention, in the method of manufacturing a toothed power transmission member having an oil reservoir as set forth in the tenth aspect of the invention, a the primitive concave part includes a plurality of annular grooves.

According to a thirteenth aspect of the invention, in the method of manufacturing a toothed power transmission member having an oil reservoir as set forth in the tenth aspect of the invention, he primitive concave portion is formed by rolling.

According to a fourteenth aspect of the inventions in the method of manufacturing a toothed power transmission member having an oil reservoir as set forth in the eleventh aspect of the invention, the spiral groove is formed by rolling.

According to a fifteenth aspect of the invention, a female spline shaft is manufactured by the method of manufacturing the toothed power transmission member having an oil reservoir as set forth in one of the tenth aspect of the invention, wherein a tooth surface of the female spline shaft has no burrs and is substantially flat between adjacent oil reservoirs.

According to a sixteenth aspect of the invention, a steering apparatus has a steering shaft or an intermediate shaft, wherein the steering shaft or the intermediate shaft includes a female spline shaft manufactured by the method of manufacturing the toothed power transmission member having an oil reservoir as set forth in one of the tenth aspect of the invention, further wherein a tooth surface of the female spline shaft has no burrs and is substantially flat between adjacent oil reservoirs.

According to a seventeenth aspect of the invention, in the method of manufacturing a toothed power transmission member having an oil reservoir as set forth in the first aspect of the invention, the primitive concave portion includes a spiral groove or a linear groove, and the step of forming a tooth surface includes a step of forming a tooth such that a bottom portion of the spiral groove or the linear groove is left on the toothed power transmission member work in a region that includes the spiral groove or the linear groove.

The spiral groove is cut onto the toothed power transmission member work with a turning process. The cutting can accurately be performed by using a master screw of the lathe and applying a bite, whose major cutting edge is rounded, thereto. Further, according to a nineteenth aspect of the invention, it is preferable that a plastic working is employed to form a tooth, for instance, a gear tooth, or a spline tooth. For example, the gear tooth is processed by rolling through the use of a rack type tool or forming rolls. In this forming of the gear tooth by rolling, the bottom portion of the groove of the tooth is left. At that time, the left bottom portion of the groove serves as an oil reservoir that assists fluid lubrication.

According to such an oil reservoir forming method, many oil reservoirs can efficiently be formed in time with the forming of the tooth surface without performing grooving, due to the spiral groove cut in the toothed power transmission member work.

According to a an eighteenth aspect of the invention, in the method of manufacturing a toothed power transmission member having an oil reservoir as set forth in the first aspect of the invention, the primitive concave portion includes a spiral groove or a linear groove, and the step of forming a tooth surface includes a step of forming a screw thread or a screw shaft such that a bottom portion of the spiral groove or the linear groove is left on the toothed power transmission member working a region that includes the spiral groove or the linear groove.

The spiral groove is cut onto the toothed power transmission member work in a turning step. The cutting can accurately be performed by using a master screw of the lathe and applying a bite, whose major cutting edge is rounded, thereto. Further, according to a twentieth aspect of the invention, it is preferable that a plastic working is employed to form a screw thread or a screw shaft in the toothed power transmission member work. The screw thread or the screw shaft is processed by using a pair of round dies. In this forming of the screw thread or the screw shaft by rolling, the bottom portion of the groove of the screw thread is left. At that time, the left bottom portion of the groove serves as an oil reservoir that assists fluid lubrication.

According to such an oil reservoir forming method, many oil reservoirs can efficiently be formed in time with the forming of the screw thread or the screw groove without performing grooving, due to the spiral groove cut in the screw shaft work.

According to a twenty first to a twenty fourth aspects of the invention, in the method of manufacturing a toothed power transmission member having an oil reservoir as set forth in the first aspect of the invention, the toothed power transmission member includes a pinion, the step of forming a primitive concave portion includes a step of forming a spiral groove on a pinion work, and the step of forming a tooth surface includes a step of forming a gear tooth by plastic working such that a bottom portion of the groove is left on the pinion work in a region that includes the spiral groove, further where in the method of manufacturing a toothed power transmission member having an oil reservoir further comprises a step of finishing the forming of toothed power transmission member by machining. Also, there is provided a pinion which is manufactured by the method of manufacturing the toothed power transmission member having an oil reservoir such that a tooth surface of the pinion has no burrs and is substantially flat between adjacent oil reservoirs.

Further, according to a twenty fifth to a twenty seventh aspects of the invention, in the method of manufacturing a toothed power transmission member having an oil reservoir as set forth in the first aspect of the invention, the toothed power transmission member includes a rack, the step of forming a primitive concave portion includes a step of forming a spiral groove on a rack work, and the step of forming a tooth surface includes a step of forming a gear tooth by plastic working such that a bottom portion of the groove is left on the rack work in a region that includes the spiral groove, further wherein the method of manufacturing a toothed power transmission member having an oil reservoir further comprises a step of finishing the forming of toothed power transmission member by machining. Also, there is provided a rack which is manufactured by this method of manufacturing the toothed power transmission member having an oil reservoir such that a tooth surface of the rack has no burrs and is substantially flat between adjacent oil reservoirs.

According to a twenty eighth aspect of the invention, a steering apparatus includes a gear assembly that has a pinion and a rack which mesh with each other, wherein the gear assembly has the pinion as set forth in the twenty second aspect of the invention and the rack as set forth in the twenty sixth aspect of the invention.

Advantages of the Invention

As is apparent from the foregoing configuration, according to the manufacturing method of the invention, the mass production of a toothed power transmission member having an oil reservoir whose ability to hold a lubricating agent is enhanced, which has hitherto been difficult to achieve, can be achieved without increasing the manufacturing cost so much.

Also, no burrs are generated on the tooth surface between the oil reservoirs of the toothed power transmission member manufactured by the manufacturing method according to the invention. Consequently, there is no necessity for removing burrs.

BRIEF DESCRIPTION OF THE DRAWINGS

FIG. 1 is a partially cross-sectional view of a primary part of a stamp forging apparatus that can implement the invention.
FIG. 2 is a perspective view showing the shape of a work
[FIG. 3]
FIG. 4 is a photograph showing the work W, in which a spiral groove is formed, according to the first embodiment.
FIG. 5 is a photograph showing a gear having undergone the cold forging step according to the first embodiment.
FIG. 6 is a perspective view showing the shape of a work W in a second embodiment.
[FIG. 7]
FIG. 7 is a perspective view showing the shape of a work W in a third embodiment.
FIG. 8 is a perspective view showing the shape of a work W in a fourth embodiment.
FIG. 9 is a perspective view showing the shape of a work W in a fifth embodiment.

FIG. 10 shows a female spline shaft manufactured by a manufacturing method according to the invention, wherein (1) is a longitudinally cross-sectional view of the female spline shaft, and (2) is a right side view of the cross-section shown in (1).
FIG. 11 shows tooth surfaces of the female spline shaft shown in FIG. 10, wherein (1) is an enlarged perspective view of the tooth surfaces, (2) is an enlarged perspective view of an oil reservoir formed in the tooth surface, and (3) is an enlarged cross-sectional view of the oil reservoir formed in the tooth surface.
FIG. 12 is an enlarged perspective view showing the tooth surfaces of a female spline shaft manufactured by a manufacturing method according to another embodiment of the invention.
FIG. 13 is an explanatory view showing a manufacturing process of a female spline shaft according to the invention.
FIG. 14 shows a turning process according to a method of the invention wherein (a) is a front view of a pinion work in which a spiral groove is formed, and (b) is a detail view showing the spiral groove.
FIG. 15 shows a plastic working process according to a method of the invention, wherein (a) is a front view of a pinion work in which gear teeth are formed, and (b) is a transversally cross-sectional view showing the gear teeth.
FIG. 16 shows a machine finishing process according to a method of the invention and is a front view of a pinion work in which a shaft portion is finished.
FIG. 17 shows a pinion processed by a method according to the invention, wherein (a) is an enlarged front view showing a primary part of the pinion, and (b) is a detail view of an oil reservoir.
FIG. 18 shows a plastic working process according to a method of the invention, wherein (a) is a front view of a pinion work in which gear teeth are formed, and (b) is a transversally cross-sectional view showing the gear teeth.
FIG. 19 is an enlarged tooth profile view of gear teeth of a pinion according to a method of the invention.
FIG. 20 is a perspective view of a mold used in a method according to the invention.
FIG. 21 is an enlarged front view showing a primary part of a pinion processed by a method according to the invention.
[FIG. 22]
FIG. 22 shows a plastic working process according to a method of the invention, wherein (a) is a front view of a pinion work in which gear teeth are formed, and (b) is a transversally cross-sectional view showing the gear teeth.
FIG. 23 is an enlarged front view showing a primary part of a pinion processed by a method according to the invention.
FIG. 24 shows a turning process according to a method of the invention and is a perspective view of a screw shaft in which a spiral groove is formed.

FIG. 25 shows a plastic working process according to a method of the invention, and is a perspective view showing a molded state due to rolling.

FIG. 26 shows a plastic working process according to a method of the invention and is a detail view of an oil reservoir formed in a screw thread.

FIG. 27 is an enlarged view showing a primary part of a screw shaft processed by a method according to the invention.

FIG. 28 shows a turning process according to a method of the invention and is a perspective view of a rack work in which a spiral groove is processed.

FIG. 29 shows a press working process according to a method of the invention and is a conceptual view showing a formed state of gear teeth.

FIG. 30 shows a rack processed by a method of the invention, wherein (a) is a perspective view of a rack work in which gear teeth are formed, and (b) is a detail view of the gear teeth.

FIG. 31 shows a turning process according to a method of the invention and is a perspective view of a rack work in which a linear groove is formed.

FIG. 32 is a cross-sectional view showing a gear assembly incorporated into a steering apparatus according to the invention.

FIG. 33 is a front view showing a conventional steering apparatus having a telescopic shaft.

FIG. 34 shows a male spline shaft constituting an intermediate shaft shown in FIG. 33, wherein (1) is a front view of the male spline shaft, and (2) is a cross-sectional view taken along line A-A shown in (1).

FIG. 35 shows a female spline shaft constituting the intermediate shaft shown in FIG. 33, wherein (1) is a longitudinally cross-sectional-view of the female spline shaft, and (2) is a right side view of the cross-section shown in (1).

FIG. 36 is an explanatory view showing a conventional manufacturing process of the female spline shaft shown in FIG. 35.

Figure 1:
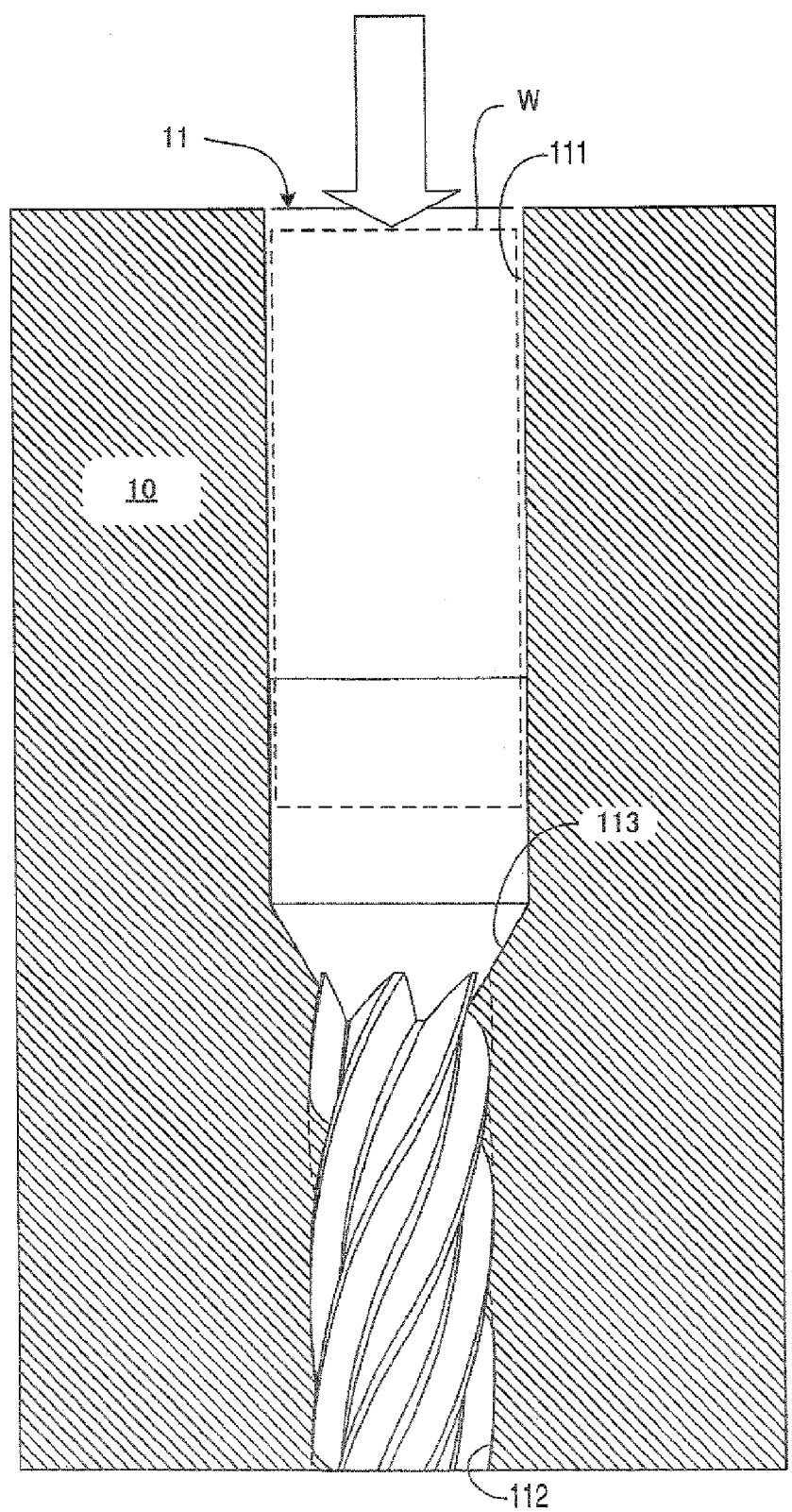
[FIG. 1]

| Description of Reference Numerals and Signs | |
|---|---|
| 10 | forging mold |
| 11 | hole |
| 111 | cylindrical introduction portion |
| 112 | a tooth profile complementation portion |
| 113 | guide portion |
| 21, 25 | spiral grooves |
| 23 | annular groove |
| 24 | longitudinal groove |
| 26 | concave portion |
| W | work |
| 12 | intermediate shaft |
| 121 | male spline shaft |
| 122 | female spline shaft |
| 123 | resin |
| 124 | inner circumferential surface |
| 125 | male spline |
| 13 | steering shaft |

-continued

| Description of Reference Numerals and Signs | |
|---|---|
| 14 | steering gear |
| 15 | rack shaft |
| 16 | pinion shaft |
| 17 | cardan joint |
| 18 | steering wheel |
| 3 | female spline shaft |
| 31 | inner circumferential surface |
| 32 | circumferential groove |
| 33 | inner circumferential surface |
| 34 | female spline |
| 35 | oil reservoir |
| W1 | hollow cylindrical work |
| W2 | intermediate work |
| P, P1 | pitches |
| B, B1 | groove widths |
| D, D1 | groove depths |
| W3 | pinion work |
| 302, 314, 319 | spiral grooves |
| 303, 322 | gear teeth |
| 304, 311, 312 | pinions |
| 305, 316, 324 | oil reservoirs |
| W4 | screw shaft work |
| 315 | screw thread |
| 317 | screw shaft |
| W5 | rack work |
| 323 | rack |

BEST MODE FOR CARRYING OUT THE INVENTION

Before describing the description of the following embodiments, an apparatus for manufacturing a toothed power transmission member by stamp-forging will be described below. The apparatus is not a special one. Stamp forging apparatuses described in the Patent Document 4 to the Patent Document 7 may be used as such apparatus.

FIG. 1 is a partially cross-sectional view of a primary part of such a stamp forging apparatus. A hole 11 is formed in a central portion of a forging mold 10. A tooth profile complementation portion 112 is provided under this hole and has a shape complementary to the outer shape of a target toothed power transmission member. A cylindrical introduction portion 111 is provided above the tooth profile complementation portion 112. Also, a work W is introduced into this hole 11. A conical guide portion 113 is formed at the boundary between the cylindrical introduction portion 111 and the tooth profile complementation portion 112.

When the work W is processed, the work W is inserted from above into the cylindrical introduction portion 111. The work W is downwardly pushed by using an upper mold (not shown). Then, the material of the work W is moved through the guide portion 113 to the tooth profile complementation portion 112 by simultaneously undergoing plastic deformation. When the work W is pressed to a predetermined position, the depressive movement of the upper mold is stopped. Consequently, the deformation of the work W enables the transfer of the shapes of the guide portion 113 and the tooth profile complementation portion 112 onto the work W.

Subsequently, the upper mold is pulled up. Also, the work W is pushed up by being struck from below with a knockout pin (not shown). Thus, a toothed power transmission member, which is completed, is taken out. Consequently, a toothed power transmission member having not only a (spur) tooth extending along an axial line but also an inclined tooth as shown in FIG. 1 can be manufactured.

The processing is performed as cold working, and the tooth surface is made to be sufficiently smooth. Thus, the completed member can be used as toothed power transmission members, such as gears, for intended ordinary purposes. Further, it is unnecessary to perform finish processing, such as grinding, for removing burrs and so on.

According to the invention, a pre-processing process (a primitive concave portion forming step), as described in the description of each embodiment, is performed on the work W. An oil reservoir is formed on a tooth surface of a completed product by performing the pre-machining process thereon.

First Embodiment

Figure 2:
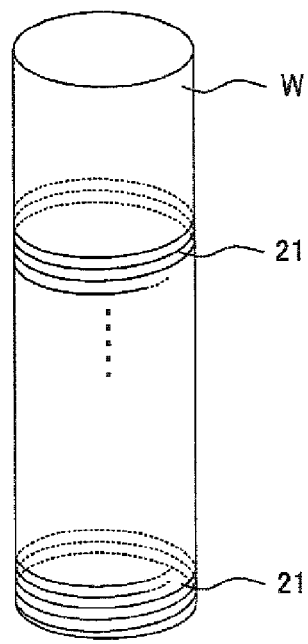
[FIG. 2]

FIG. 2 is a perspective view showing the shape of the work W used in a first embodiment. A spiral groove serving as a fine primitive concave portion, which is basis for an oil reservoir, is formed in a cylindrical surface of the work W. In the case of the first embodiment, the primitive concave portion forming step can simply be performed by cutting spiral grooves at narrow intervals in a cylindrical surface with a lathe.

The work W, in which this spiral groove is formed, is pushed into a forging mold 10 having a cross-section, whose shape is complementary to that of a target toothed power transmission member, as shown in FIG. 1. This step is a cold forging one. The number of spiral grooves can be either one or plural.

Figure 3:
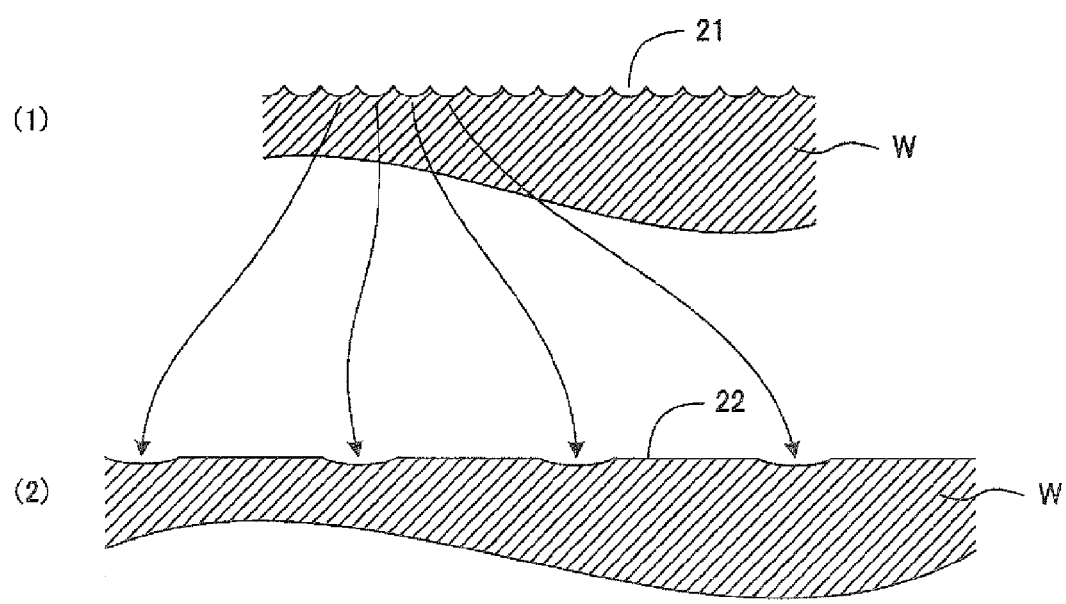
FIG. 3 is an explanatory view showing a part of a cross-section including an axis of the work W according to the first embodiment, wherein (1) shows the work having undergone a primitive concave portion forming step, and (2) shows the work having undergone a cold forging step.

FIG. 3 is an explanatory view showing a part of a cross-section including an axis of the work W, wherein (1) shows the work having undergone a primitive concave portion forming step, and (2) shows the work having undergone the cold forging step.

As shown in FIG. 3(1), the interval of the spiral grooves 21 having just undergone the primitive concave portion forming step is dense. However, when the work W has undergone the cold forging step the spiral grooves, the interval and the widths of the spiral grooves 21 are increased. Also, the depths of the spiral grooves 21 are decreased. Then, linear portions are formed between the spiral grooves 21. The linear portion forms a contour extending along the surface of the forging mold 10. Taking a macroscopic view, the linear portion forms the outer shape of the toothed power transmission portion, for instance, a gear. Taking a microscopic view, the initial spiral views 21 are left as shallow-groove-like traces. Thus, the traces serve as oil reservoirs. The traces of the spiral grooves 21 (the oil reservoirs) are present not only on the tooth surfaces but also on tooth bottom portions and tooth top portions. However, this does not cause any particular disadvantages.

Figure 4:
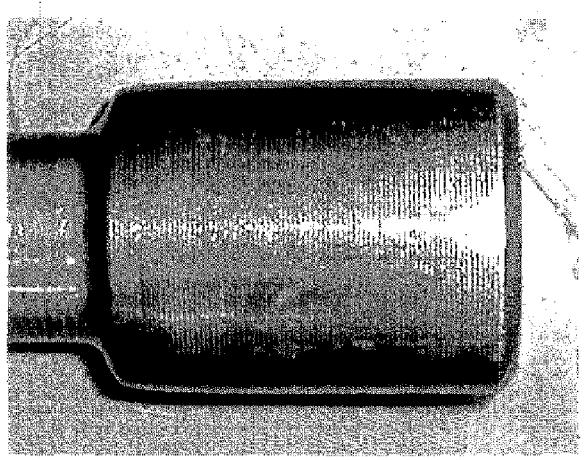
[FIG. 4]
Figure 5:
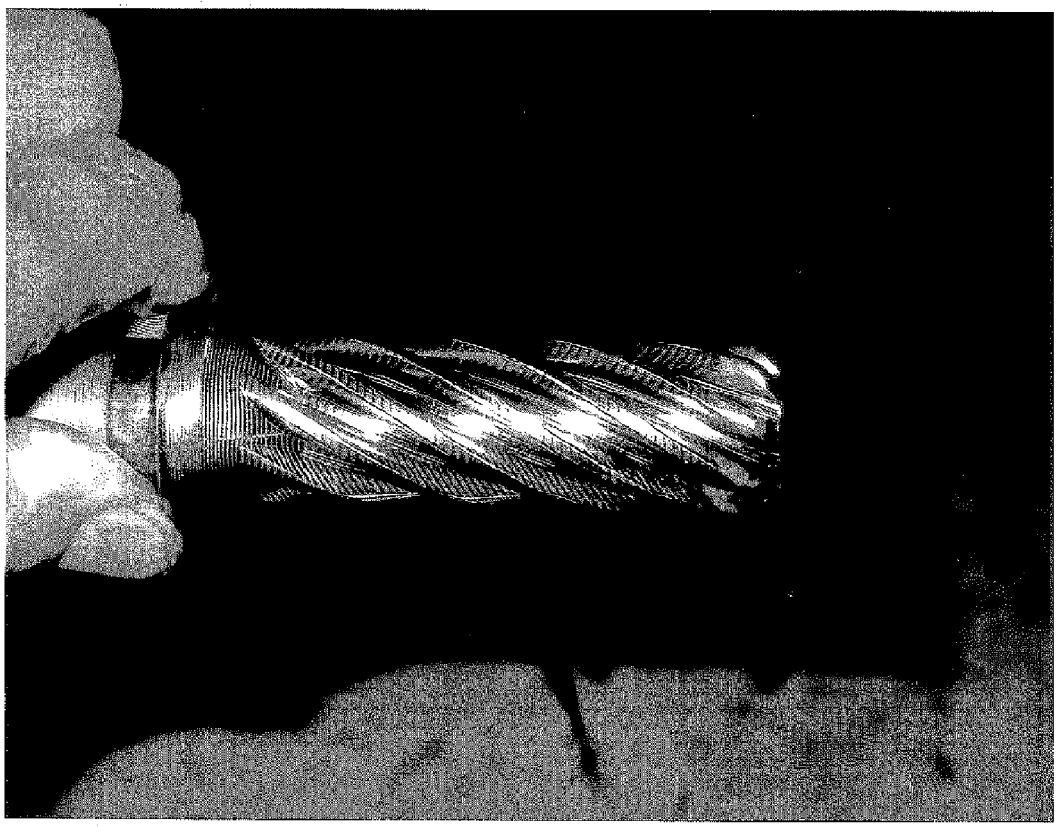
[FIG. 5]

FIG. 4 is a photograph showing the work W, in which a spiral groove is formed. FIG. 5 is a photograph showing a gear having undergone the cold forging step. As is seen from the photograph shown in FIG. 5, it is recognized that stripe-like patterns are present not only on the tooth surfaces of the gear portion but also on the tooth top portions, tooth bottom portions and the circular cone portion thereof. This is because the linear portion and the shallow-groove-like trace (that is, the oil reservoir) are alternately present, so that the linear portions and the traces appear like stripes. Although curved parts are generated on the stripe-like pattern, this is due to a flow speed of the material which varies with places upon forging.

Second Embodiment

Figure 6:
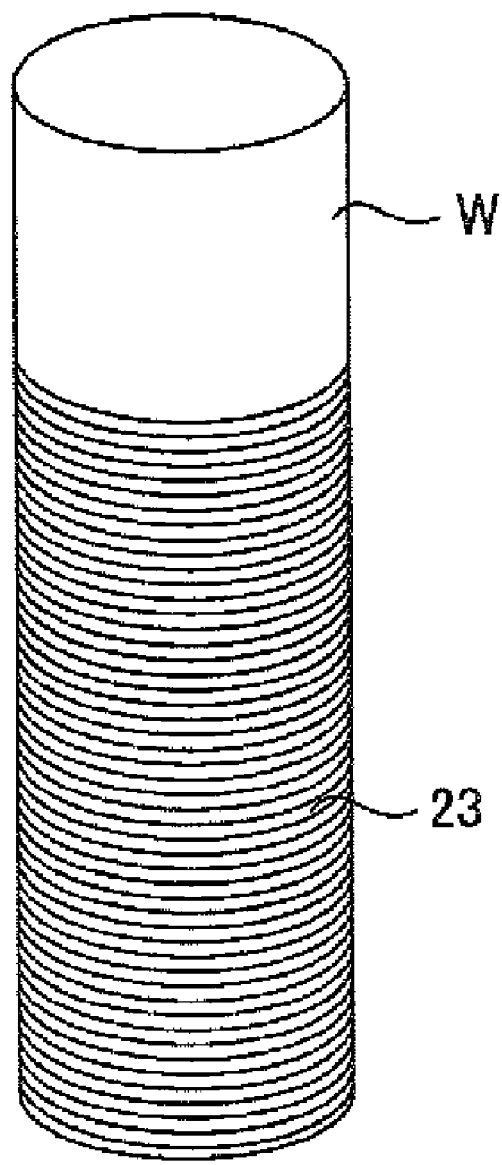
[FIG. 6]

FIG. 6 is a perspective view showing the shape of a work W in a second embodiment. Many annular grooves 23 are formed as primitive concave portions, which are basis for oil reservoirs, in the cylindrical surface of the work W. The second embodiment is similar to the first embodiment, except that the formed grooves are annular.

Third Embodiment

FIG. 7 is a perspective view showing the shape of a work W in a third embodiment. Many longitudinal grooves 24 are formed along the direction of a length as primitive fine concave portions, which are basis for oil reservoirs, in the cylindrical surface of the work W. The longitudinal grooves 24 can be formed by cutting with a ring-like cutting tooth or a shaper, or by rolling with a toothed mold. The third embodiment is similar to the first embodiment, except that the formed grooves are longitudinal ones.

Fourth Embodiment

Figure 8:
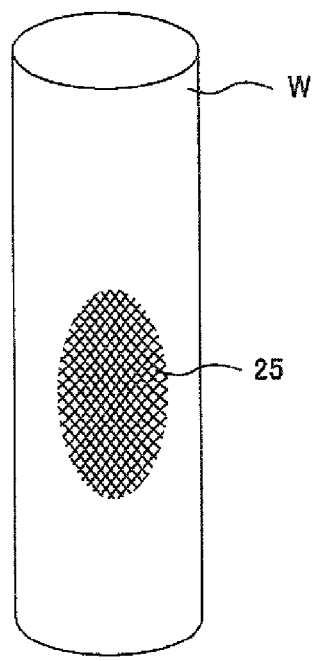
[FIG. 8]

FIG. 8 is a perspective view showing the shape of a work W in a fourth embodiment. In this embodiment, spiral grooves 25, each having a large lead angle, are formed as the primitive concave portions and are made to intersect with each other. In addition to the cutting, a knurling method can be utilized for processing the primitive concave portion.

Fifth Embodiment

Figure 9:
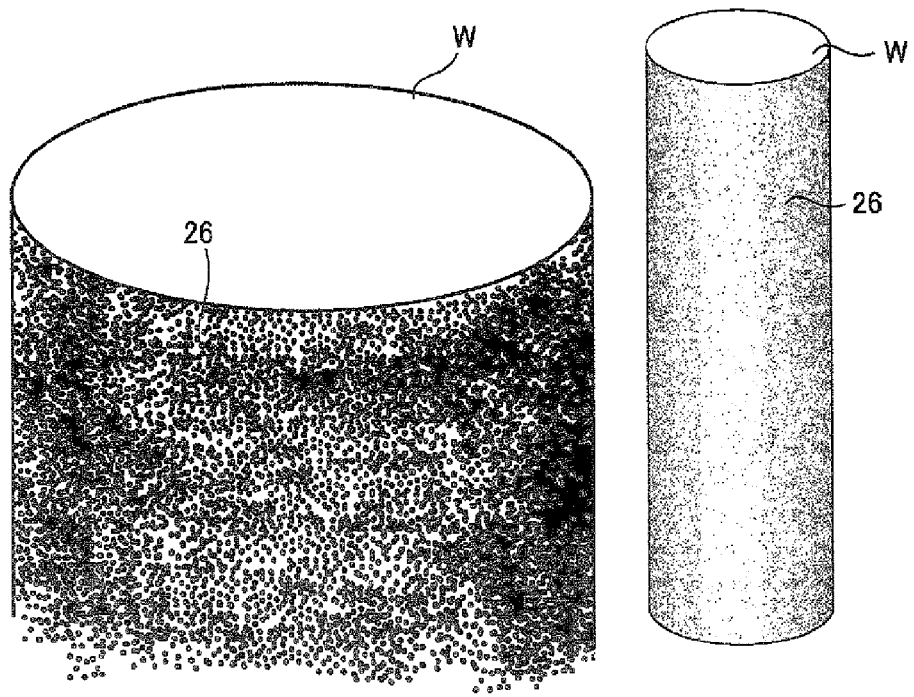
[FIG. 9]

FIG. 9 is a perspective view showing the shape of a work W in a fifth embodiment. Differently from the aforementioned embodiments provided with the grooves, many circular concave portions 26 are formed as the primitive concave portions on a cylindrical surface. The concave portions may be formed as a regular pattern. Alternatively, the concave portions may be formed randomly as shown in FIG. 9, for example, by blasting. In this case, oil reservoirs are formed as discontinuously dispersed points like ponds.

Figure 10:
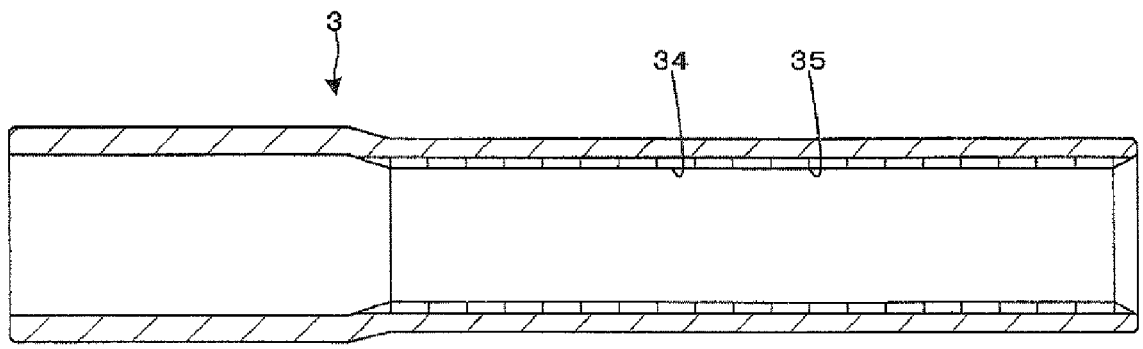
[FIG. 10]
Figure 10:
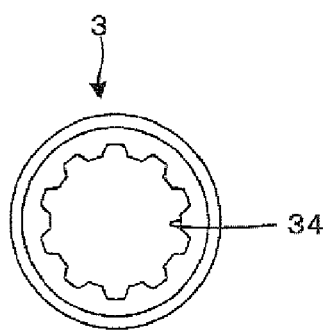
Figure 11:
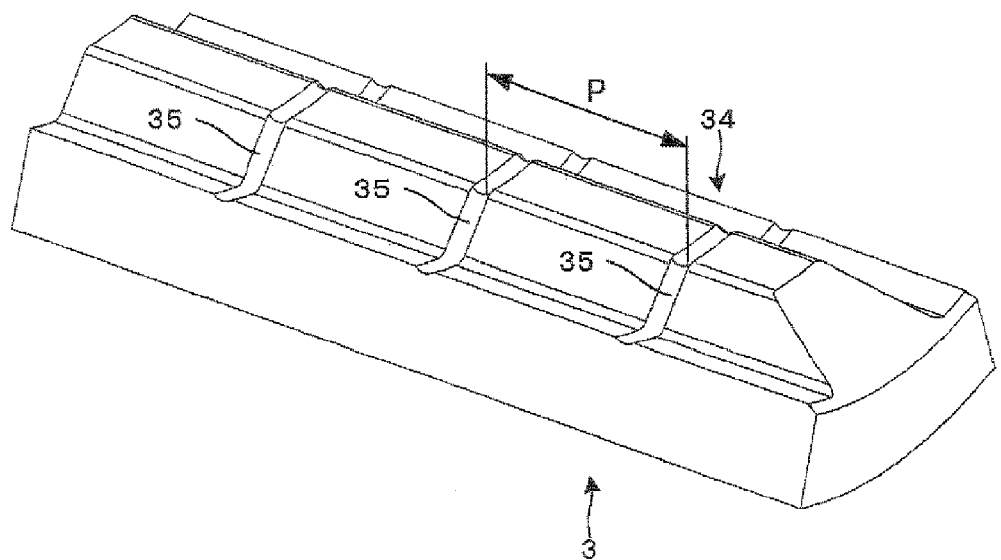
[FIG. 11]
Figure 11:
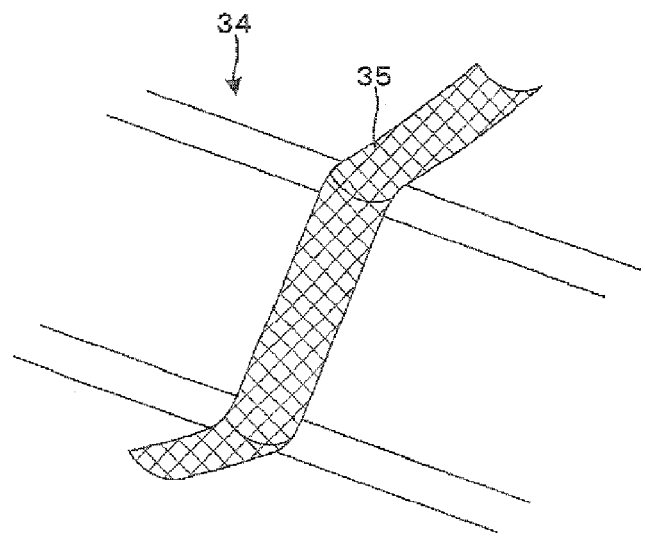
Figure 11:
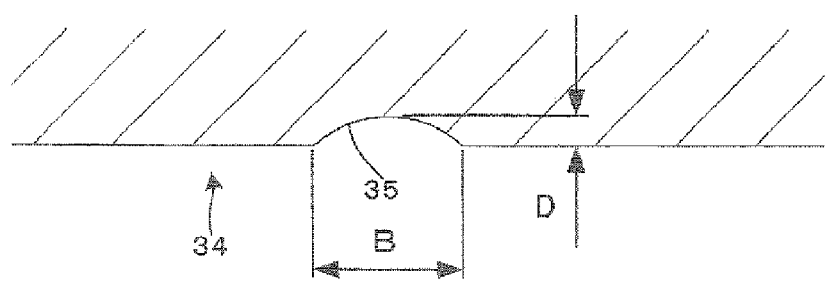
Figure 12:
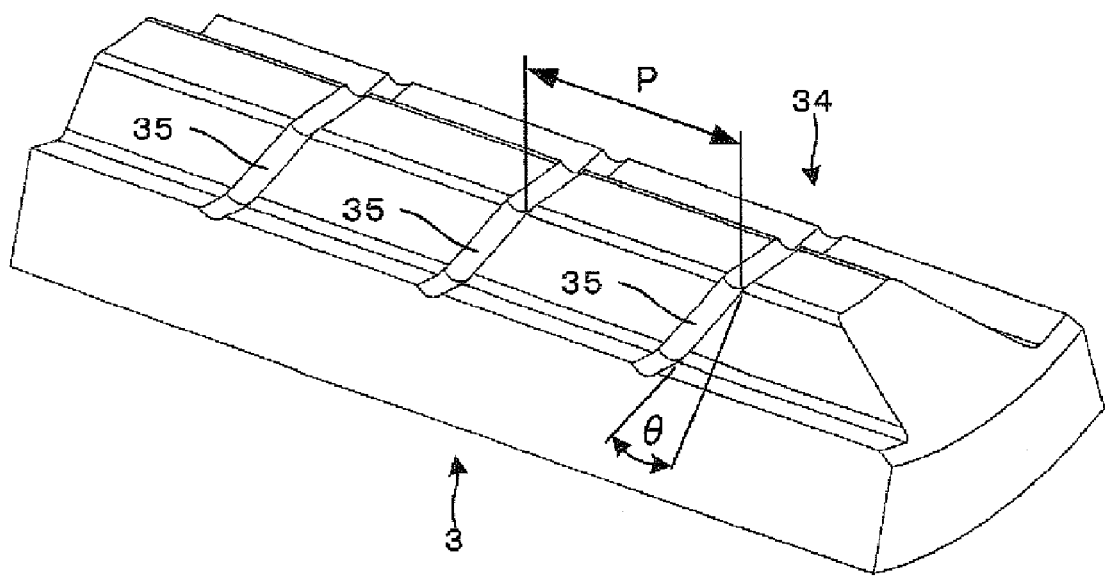
[FIG. 12]
Figure 13:
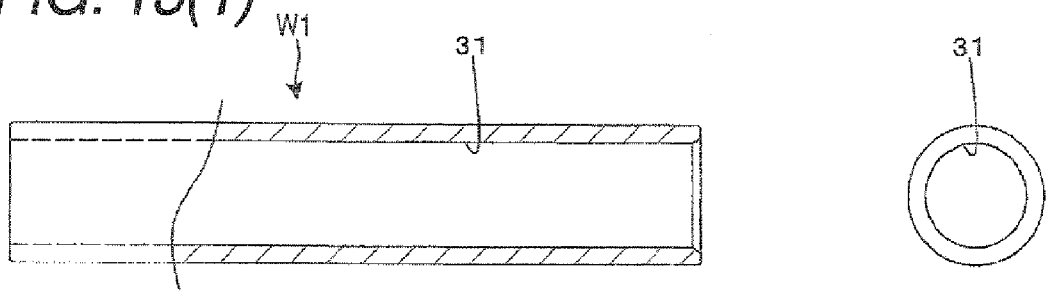
[FIG. 13]
Figure 13:
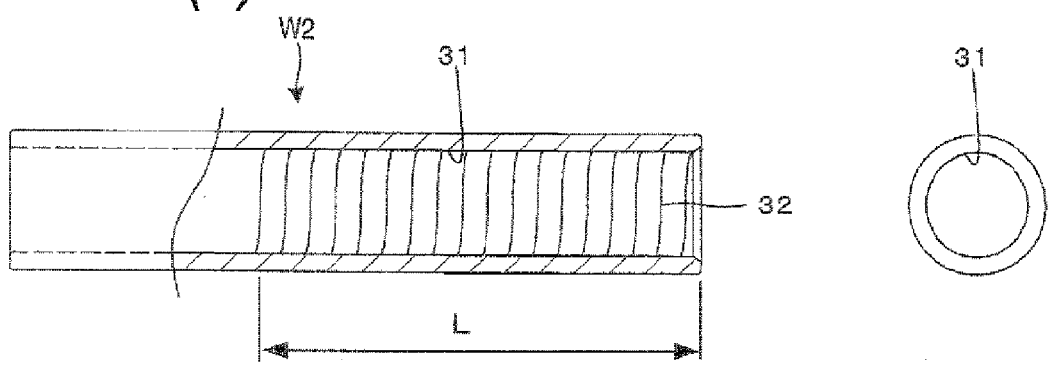
Figure 13:
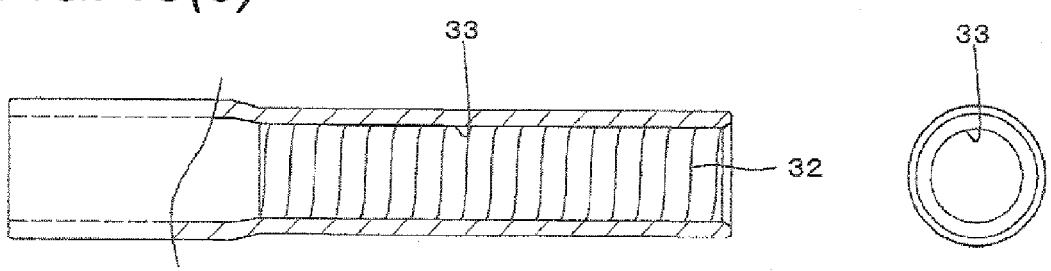
Figure 13:
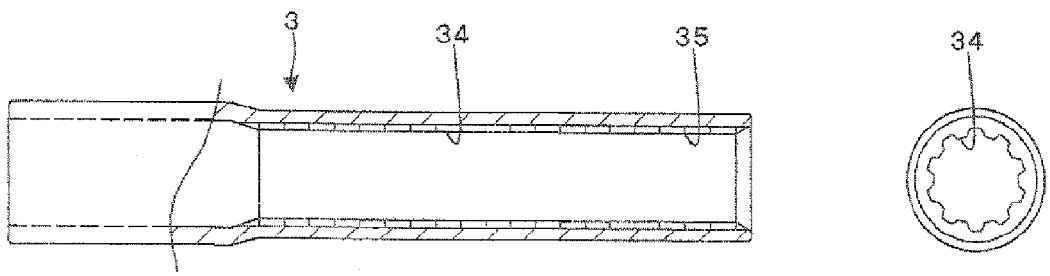
Figure 35:
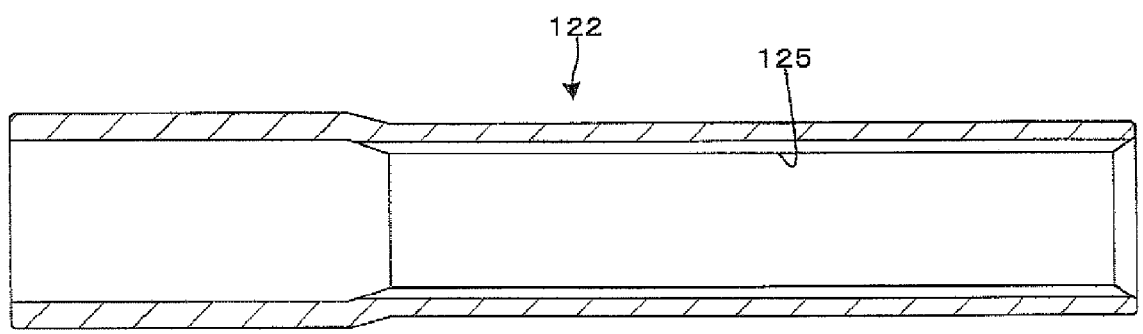
[FIG. 35]
Figure 35:
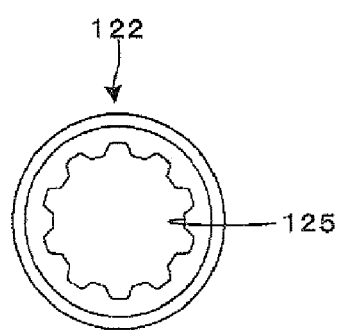
Figure 36:
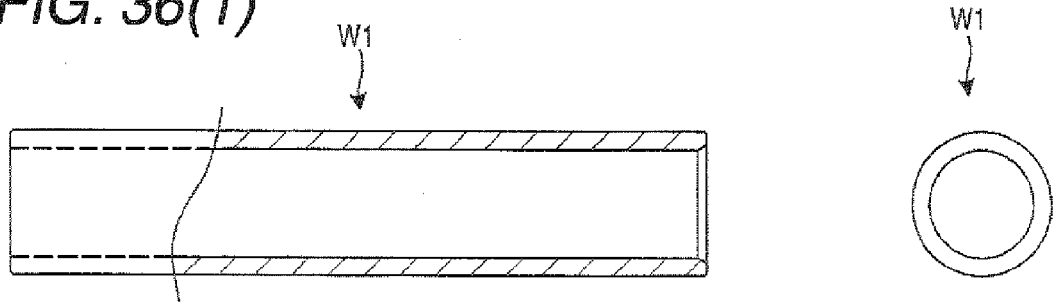
[FIG. 36]
Figure 36:
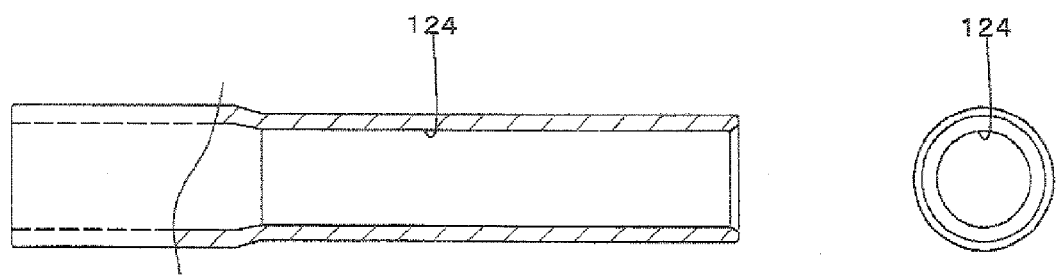
Figure 36:
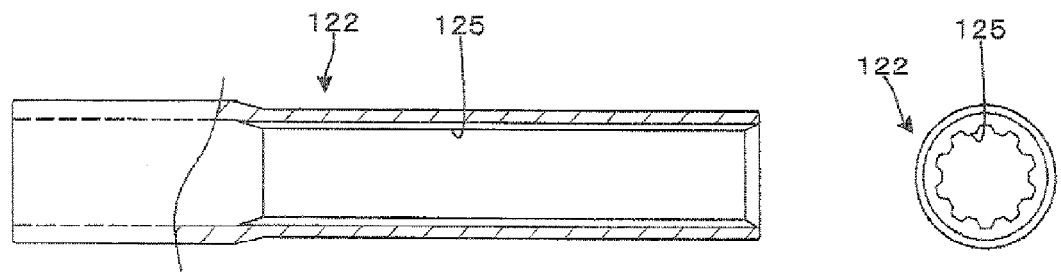

FIG. 10 shows a female spline shaft manufactured by a manufacturing method according to the invention, wherein (1) is a longitudinally cross-sectional view of the female spline shaft, and (2) is a right side view of the cross-section shown in (1). FIG. 11 shows tooth surfaces of the female spline shaft shown in FIG. 10, wherein (1) is an enlarged perspective view of the tooth surfaces, (2) is an enlarged perspective view of an oil reservoir formed in the tooth surface, and e(3) is an enlarged cross-sectional view of the oil reservoir formed in the tooth surface. FIG. 12 is an enlarged perspective view showing the tooth surfaces of a female spline shaft manufactured by a manufacturing method according to another embodiment of the invention. FIG. 13 is an explanatory view showing a manufacturing process of a female spline shaft according to the invention. FIG. 36 is an explanatory view showing a conventional manufacturing process of the female spline shaft shown in FIG. 35.

As shown in FIG. 36, the conventional female spline shaft 122 is formed in the following process. That is, chemical conversion coating is performed on a hollow cylindrical work W1 shown in (1) to thereby prevent a plastic working dies and the work from being burnt. Subsequently, the diameter of a portion of the work W1, in which a female spline is formed, is reduced over the axial length of the portion by the dies as shown in (2). Then, a female spline 125 is formed in the inner circumferential surface 124, whose diameter is reduced, by the dies as shown in (3).

As shown in FIG. 13, a female spline according to the present invention is formed in the following process. That is, chemical conversion coating is performed on a hollow cylindrical work W1 shown in (1) to thereby prevent a plastic working dies and the work from being burnt. Subsequently, as shown in (2), a plurality of circumferential grooves 32 are formed in an inner circumferential surface 31 of the hollow cylindrical work W1 to thereby form an intermediate work W2. Methods of forming the circumferential grooves 32 are to form a plurality of annular grooves, and to form a single or many spiral grooves. The circumferential grooves 32 maybe formed at least over the axial length L of a portion in which the female spline is formed because the inner circumferential surface 31 of the hollow cylindrical work W1 is cylindrical, the circumferential grooves 32 can quickly be processed by turning through the use of a grooving bite attached to a tool rest of a lathe. Thus, the cost of equipment is low. Also, the rise of the manufacturing cost can circumferential grooves 32 can efficiently be processed by turning through the use of a rolling tool, such as a rolled tap, attached to the tool rest of the lathe.

Subsequently, as shown in (3), the diameter of a portion of the work W1, in which a female spline is formed, is reduced over the axial length of the portion by cold forging through the use of the dies. Finally, a female spline 34 is formed in the inner circumferential surface 33, whose diameter has been reduced, by cold forging through the use of the dies as shown in (4). Thus, the female spline shaft 3 is manufactured.

FIG. 10 shows the female spline shaft 34 manufactured in this way, FIG. 11 shows tooth surfaces of the female spline shaft shown in FIG. 10 wherein (1) is an enlarged perspective view of the tooth surfaces of the female spline shaft 3 in which the female spline 34 is formed after annular grooves are formed as the circumferential grooves 32, (2) is an enlarged perspective view of an oil reservoir formed in the tooth surface, and (3) is an enlarged cross-sectional view of the oil reservoir formed in the tooth surface. FIG. 12 is an enlarged perspective view showing the tooth surfaces of a female spline shaft 3, in which a female spline 34 is formed after a spiral groove is formed as the circumferential groove 32.

As shown in FIGS. 11 and 12, even after the female spline 34 is formed by the dies, the circumferential grooves 32 formed in the intermediate work W2 are left as traces so that the groove breadth B and the groove depth D thereof are reduced. Thus, the circumferential grooves 32 function as an oil reservoir 35 that stores lubricating oil. Therefore, every time when a telescopic shaft, to which the female spline shaft 3 is assembled, performs a relative sliding operation, the lubricating oil is supplied from the oil reservoir 35 to the tooth surfaces of the spline to thereby ensure lubricating ability.

A lead angle θ of the spiral oil reservoir 35 shown in FIG. 12 is appropriately selected according to the diameter and the number of teeth of the female spline so that lubricating oil is effectively supplied to the tooth surfaces of the spline when the telescopic shaft performs a sliding operation. To effectively hold the lubricating oil in the oil reservoir 35 and to effectively supply the lubricating oil from this oil reservoir 35 to the tooth surfaces when the telescopic shaft performs a sliding operation, preferably, the pitch P, the groove breadth B and the groove depth D of the oil reservoir 35 are set to satisfy the following numerical expressions, in consideration of the processability.

0.5 mm<P<5 mm 0.01 mm<B<2.0 mm 0.001 mm<D<0.5 mm

To obtain the aforementioned numerical values of the pitch P, the groove breadth B, and the groove depth D of the oil reservoir 35, it is advisable to set the values of the pitch P, the groove breadth B1, and the groove depth D1 of the circumferential groove 32 formed in the inner circumferential surface 31 of the intermediate work W2 to meet the following expressions in the stage of the intermediate work W2.

0.5 mm<P1<5 mm 0.1 mm<B1<4.0 mm 0.1 mm<D1<2.0 mm

Incidentally, a male spline having an oil reservoir may be manufactured according to the invention and may be used by being combined with an ordinary female spline.

Figure 14A:
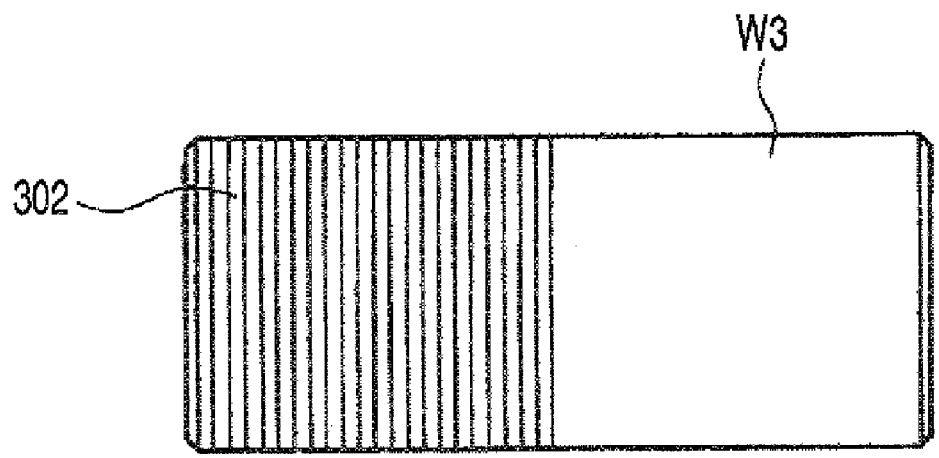
[FIG. 14]
Figure 14B:
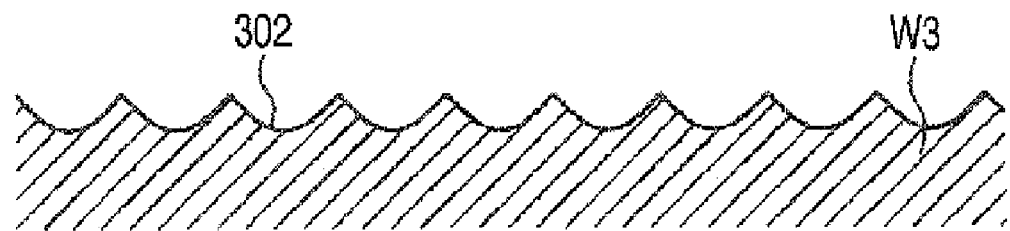

A different embodiment of the invention is described below with reference the accompanying drawings. The toothed power transmission member is a pinion of a rack-and-pinion type steering apparatus. First, a pinion work is processed to a round bar, which has a predetermined diameter, by turning. Subsequently, as shown in FIG. 14(a), a bite is applied to the pinion work W3 to process grooves 302 in a spiral shape. The spiral grooves 302 are densely cut by maintaining the lead angle at a small value. The transversal cross-sections of the grooves 302 are substantially semicircle (see FIG. 14(b)).

Figure 15A:
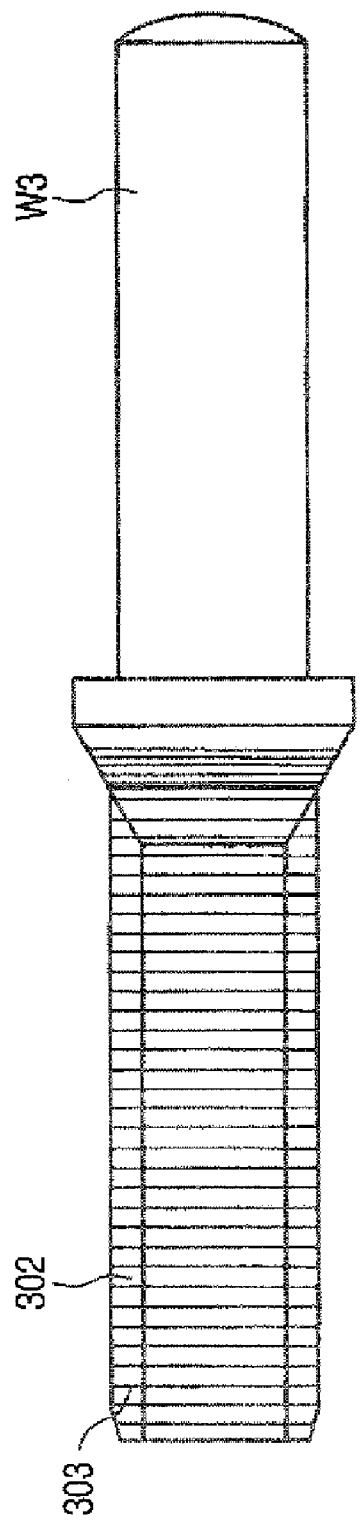
[FIG. 15]
Figure 15B:
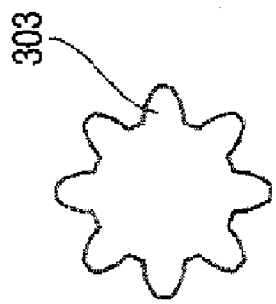

Subsequently, as shown in FIGS. 15(a) and (b), a gear tooth 303 is formed by performing plastic working, for example, rolling on the pinion work W3. The profile of this gear tooth 303 is an involute tooth. In the case of this processing, the bottom portion of the spiral groove 302, which intersects with the tooth surface in the direction of a tooth trace, is left. Parts other than the bottom portion of the groove 302 are formed as flat and smooth surfaces by plastic working.

Figure 16:
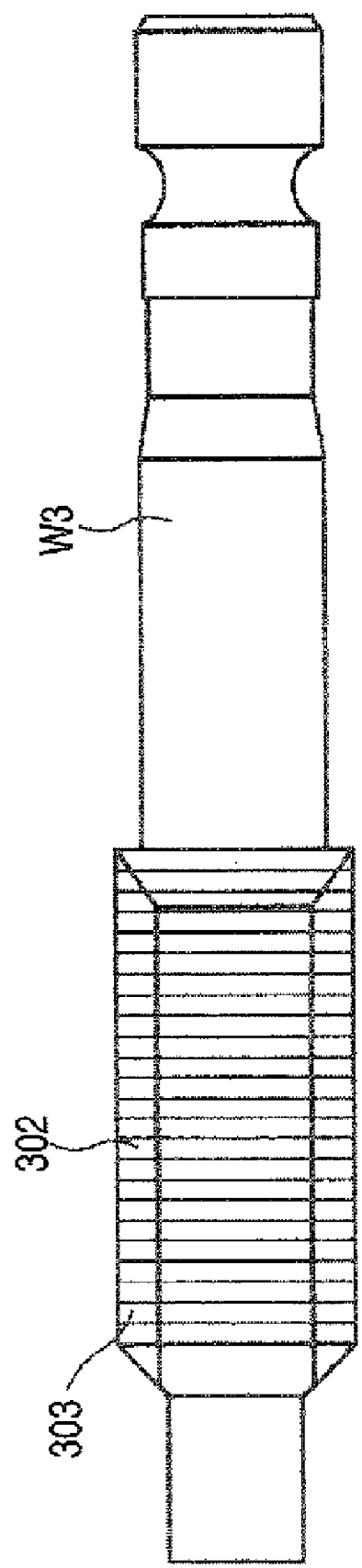
[FIG. 16]
Figure 17A:
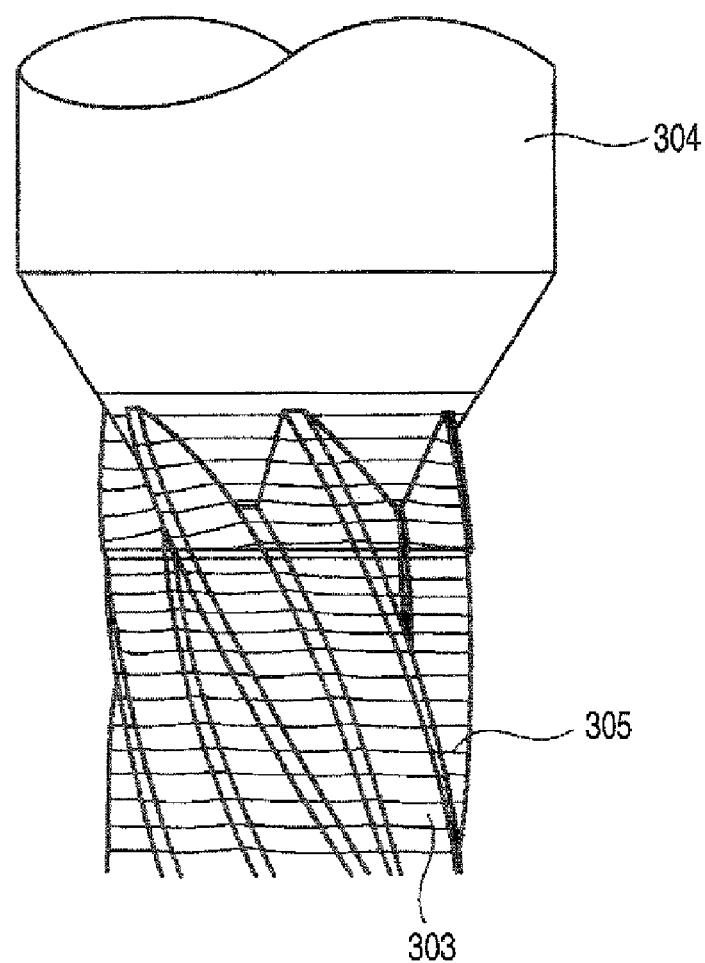
[FIG. 17]
Figure 17B:
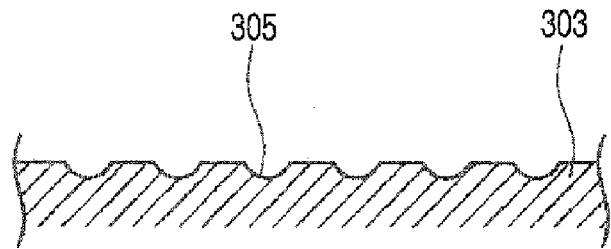

Subsequently, as shown in FIG. 16, a shaft portion other than the gear tooth 303 is finished to a predetermined dimension in a turning step. A pinion 304 shown in FIG. 17(a) can be obtained by performing the aforementioned steps. The bottom portion of the spiral groove 302 left in the tooth surface of the gear tooth 303 serves as an oil reservoir 305, which assists the fluid lubrication, as shown in FIG. 17(b).

Thus, many oil reservoirs can efficiently be formed in time with the formation of the gear tooth, by cutting the spiral groove in the pinion work, without groove processing.

Incidentally, the method utilized for the formation of the gear tooth of the pinion is not limited to rolling. As long as the oil reservoirs can be left, any plastic working such as flatting, extrusion, drawing, precision forging, and press working may be employed. Similarly, in each of the following embodiments, any of the plastic working such as rolling, flatting, extrusion, drawing, precision forging, and press working, may be employed.

Figure 18A:
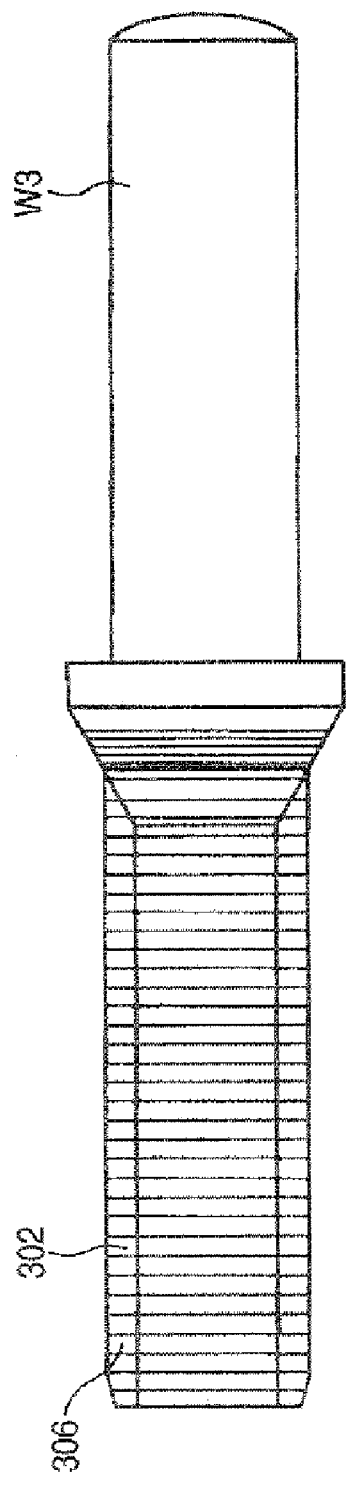
[FIG. 18]
Figure 18B:
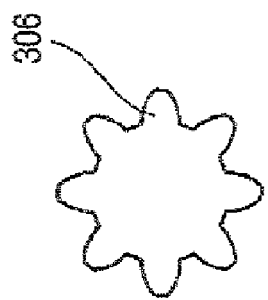
Figure 19:
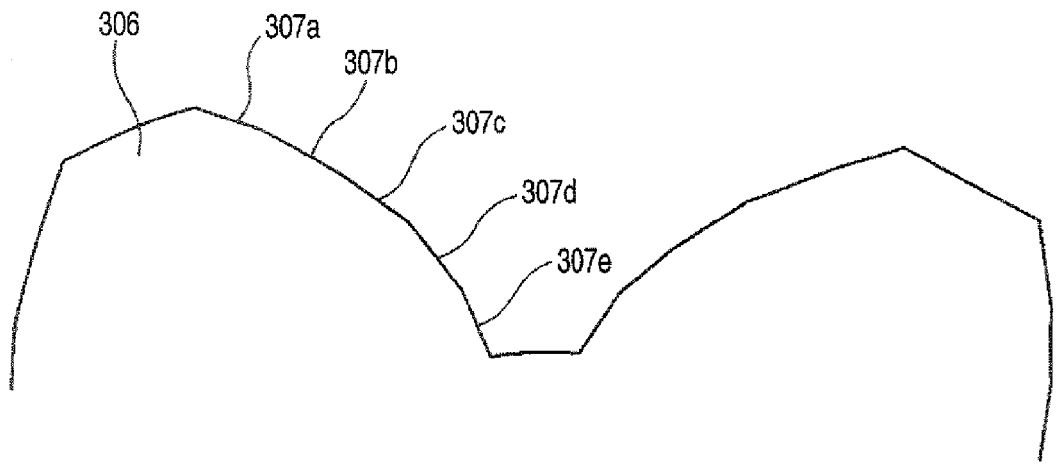
[FIG. 19]

A different embodiment of the invention is described below. The toothed power transmission member is a pinion of a rack-and-pinion type steering apparatus. First, a pinion work is processed to a round bar, which has a predetermined diameter, by turning. Subsequently, as shown in FIG. 14(a), a bite is applied to this pinion work W3. Then, a groove 302 is processed like a spiral. Subsequently, as shown in FIG. 18, a gear tooth 306 is formed by performing plastic working on this pinion work W3. The profile of the gear tooth 306 is a multiangular involute tooth. As shown in FIG. 19, the multiangular involute tooth is formed by connecting five sides 307a, 307b, 307c, 307d, and 307e at a certain angle formed according to a tangential line of a reference involute.

Figure 20:
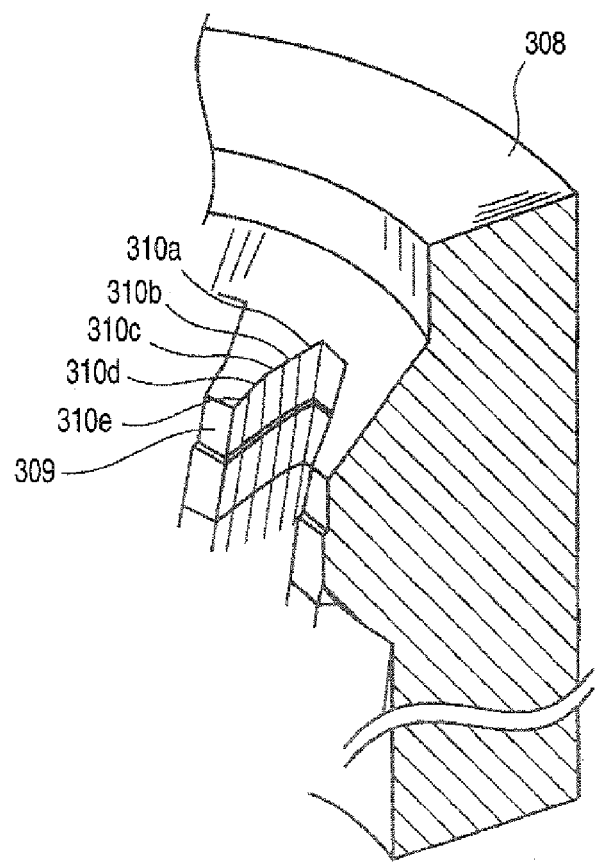
[FIG. 20]

The creation of the multiangular involute tooth is performed by using a mold 308 shown in FIG. 20. A cutting portion 309 of the mold 308 has five sides 310a, 310b, 310c, 310d, and 310e corresponding to the multiangular involute tooth. When a pinion work W3 is placed in the mold 308, the multiangular involute tooth can be formed. In the case of this processing, the bottom portion of the spiral groove 302, which intersects with the tooth surface in the direction of a tooth trace, is left. Parts other than the bottom portion of the groove 302 are formed as flat and smooth surfaces by plastic working.

Figure 21:
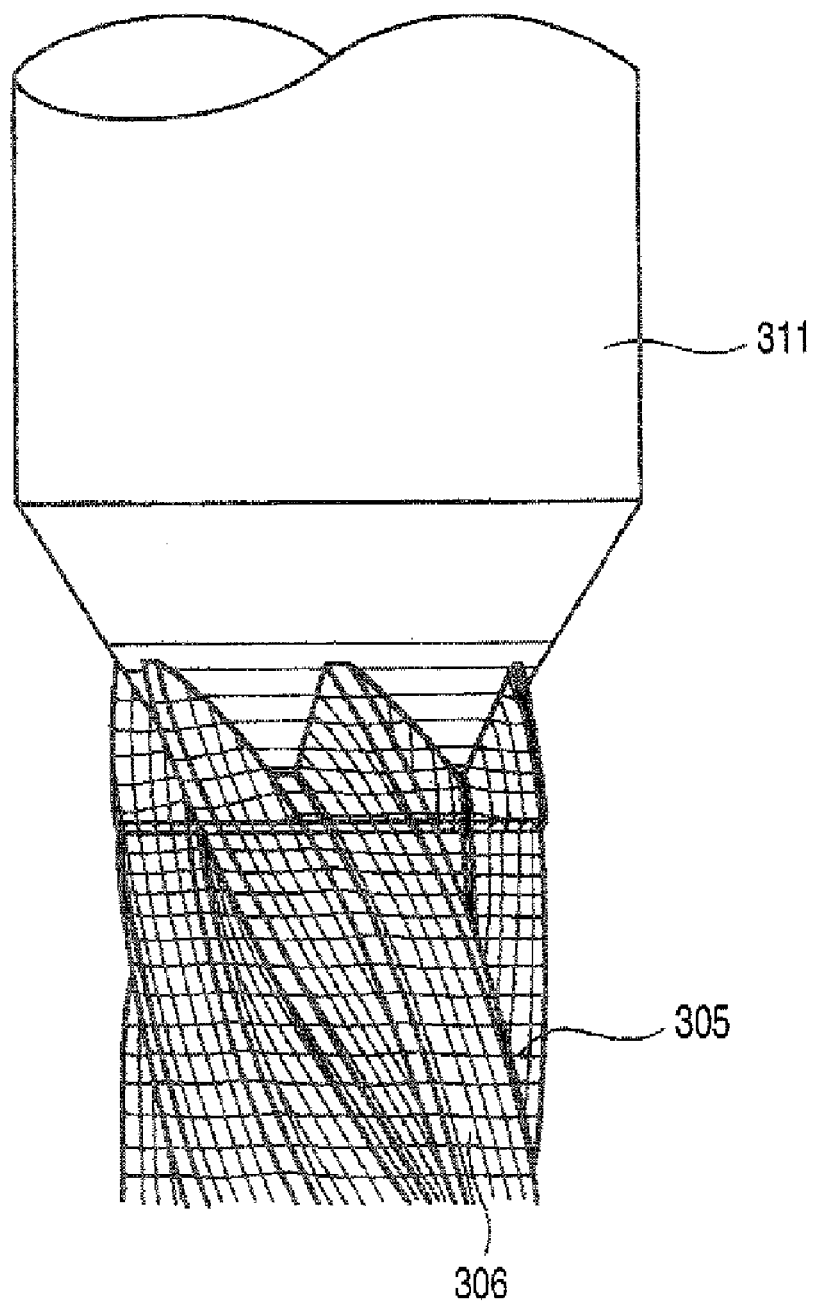
[FIG. 21]

Subsequently, the shaft portion is finished to a predetermined dimension in a turning step. A pinion 311 having a multiangular involute tooth shown in FIG. 21 can be obtained by performing the aforementioned steps. The bottom portion of the spiral groove 302 left in the tooth surface of the gear tooth 306 serves as an oil reservoir 305, which assists the fluid lubrication.

Figure 23:
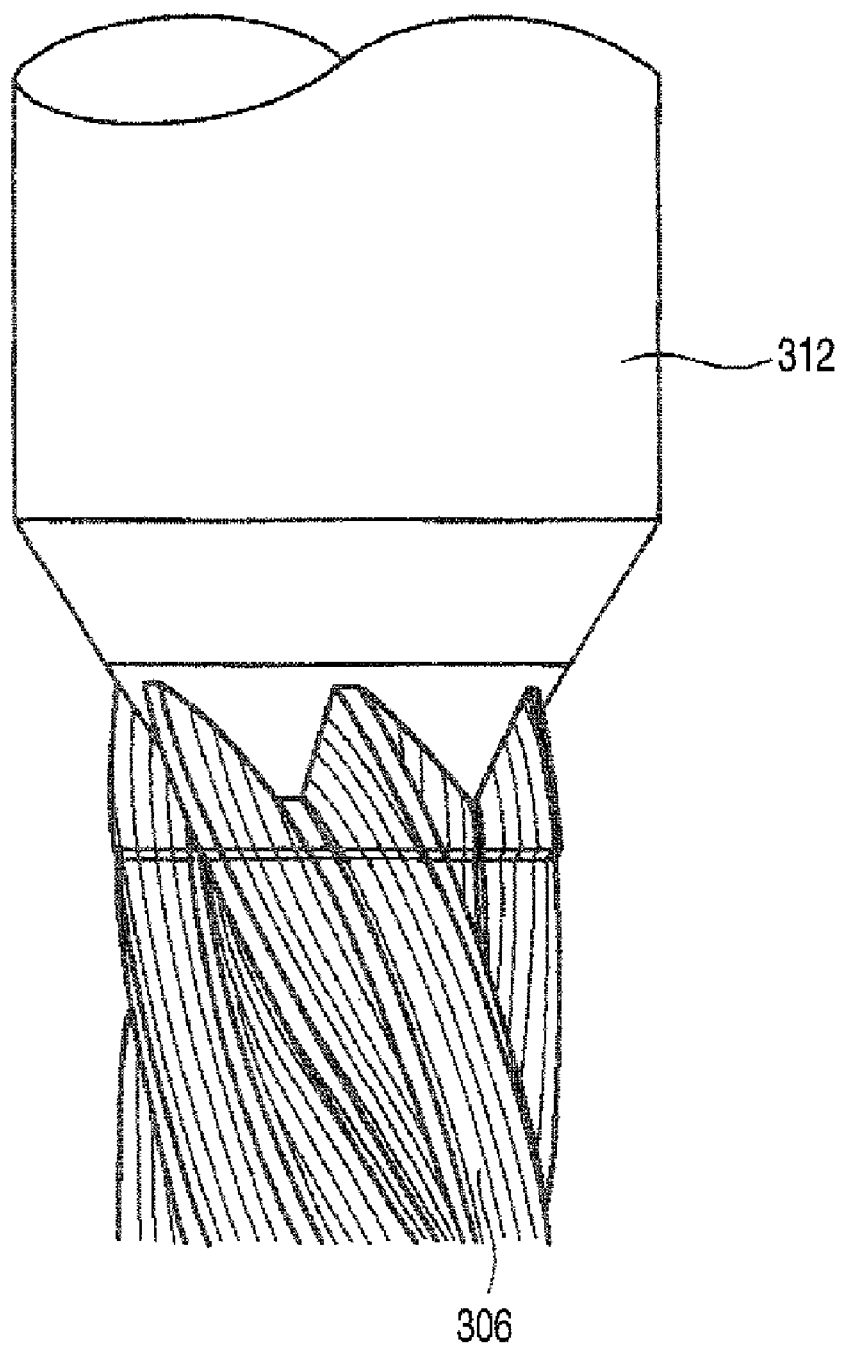
[FIG. 23]

A different embodiment of the invention is described below. The toothed power transmission member is a pinion of a rack-and-pinion type steering apparatus. First, a pinion work is processed to a round bar, which has a predetermined diameter, by turning. Subsequently, as shown in FIG. 22, a gear tooth 306 is formed in the pinion work W3 by plastic working. The profile of the gear tooth 306 is a multiangular involute tooth which is the same as that employed in the aforementioned embodiment. The gear tooth 306 is formed through a mold 308 (see FIG. 20). Subsequently, the shaft portion is finished to a predetermined dimension in a turning step. A pinion 312 shown in FIG. 23 can be obtained by performing the aforementioned steps.

Incidentally, no spiral groove is processed in the pinion work W3 in this embodiment. Thus, no oil reservoir is formed in the gear tooth 306. However, a lubrication mechanism, which is of use to form an oil film, can be constructed by processing an oil reservoir, which will be described later, in, a rack to be combined with this pinion 312, for example.

Figure 24:
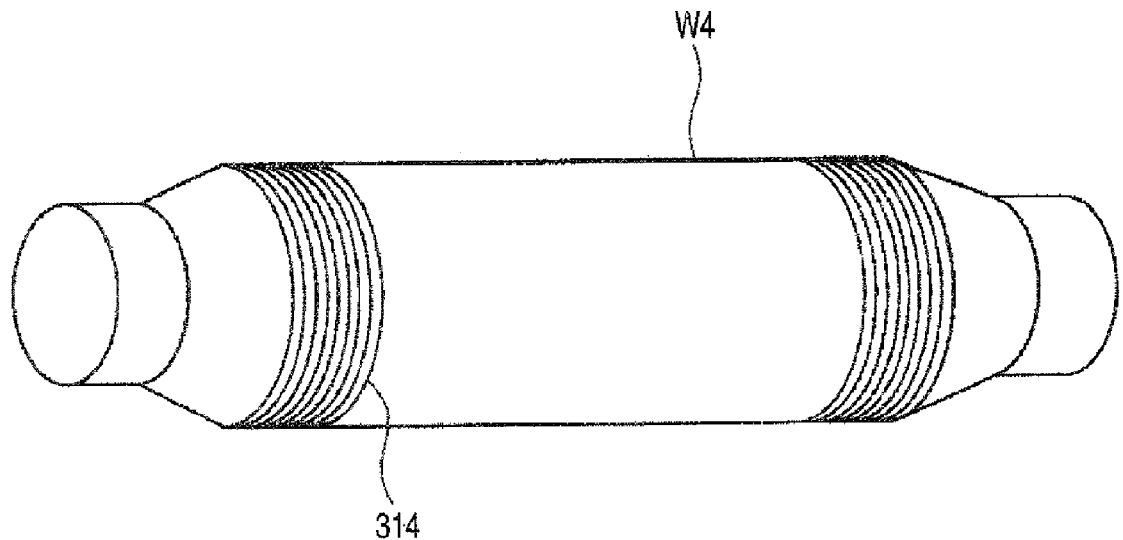
[FIG. 24]

A different embodiment of the invention is described below. The toothed power transmission member is a screw shaft of an electrical tilting mechanism or a telescopic mechanism. First, a screw shaft work is processed to a round bar, which has a predetermined diameter, by turning. Subsequently, as shown in FIG. 24, a bite is applied to an outer surface of the screw shaft work W4. Then, spiral grooves 314 are processed like spirals. The spiral grooves 314 are densely cut by maintaining the lead angle at a small value. The transversal cross section of the groove 314 is substantially semi-circle.

Figure 25:
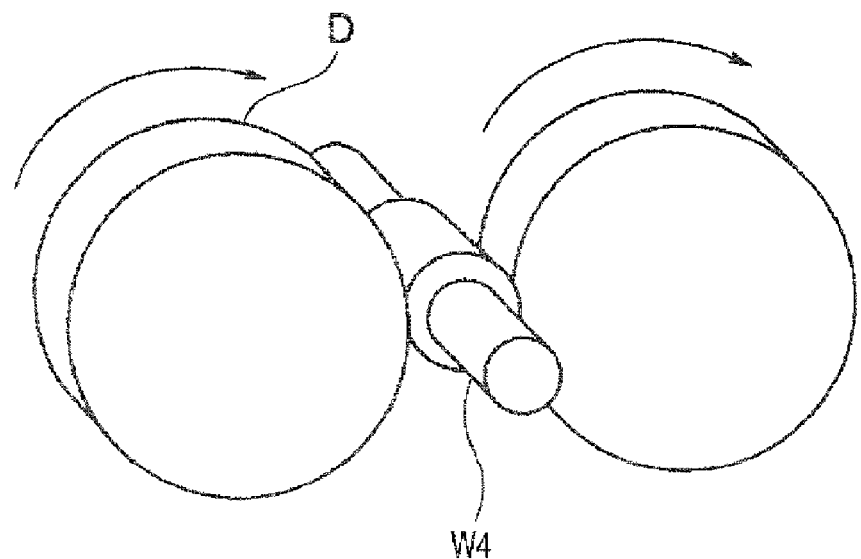
[FIG. 25]
Figure 26:
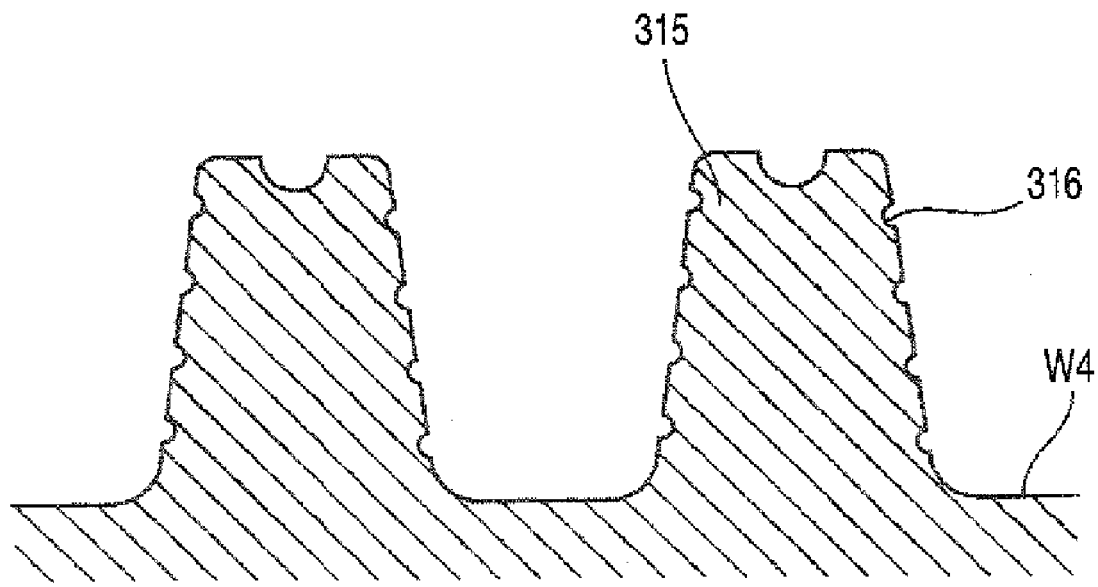
[FIG. 26]
Figure 27:
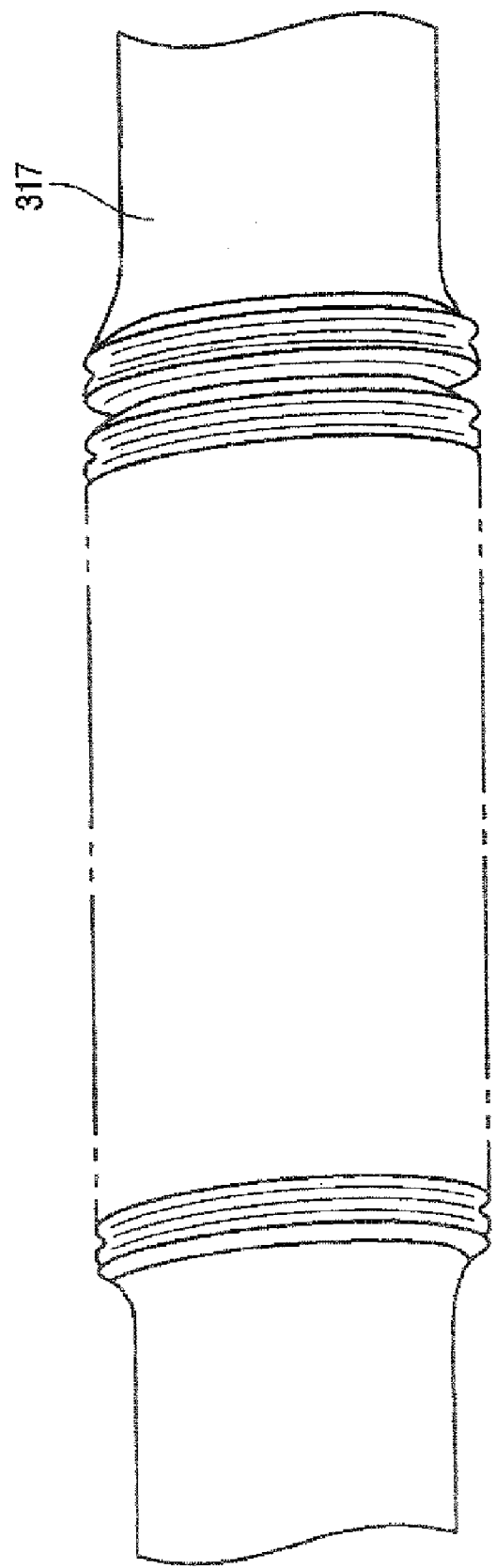
[FIG. 27]

Subsequently, as shown in FIG. 25, screw threads are formed in the screw shaft work W4 in a rolling step using a pair of round dies A. As shown in FIG. 26, screw threads 315 are formed by this rolling. Upon completion of rolling, the interval between the spiral grooves 314 is increased. Simultaneously, the depth of the spiral groove 314 is reduced. The bottom portion of the groove 314 serves as an oil reservoir that assists the fluid lubrication. A screw shaft 317 shown in FIG. 27 can be obtained by performing the aforementioned steps.

Thus, according to this embodiment, spiral grooves are cut in the screw shaft work. Consequently, oil reservoirs can efficiently be formed in time with the formation of the gear tooth, without performing groove processing.

Figure 28:
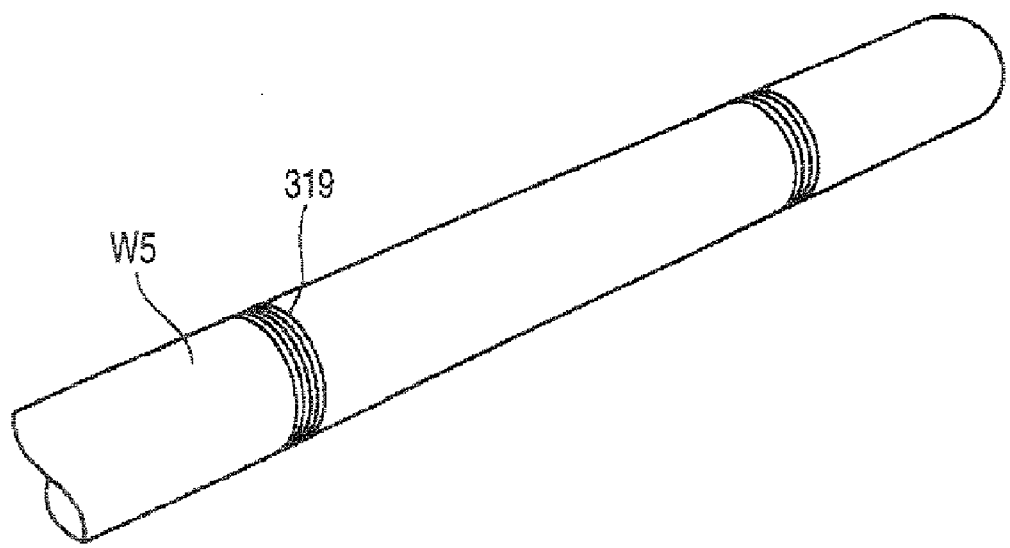
[FIG. 28]
Figure 29:
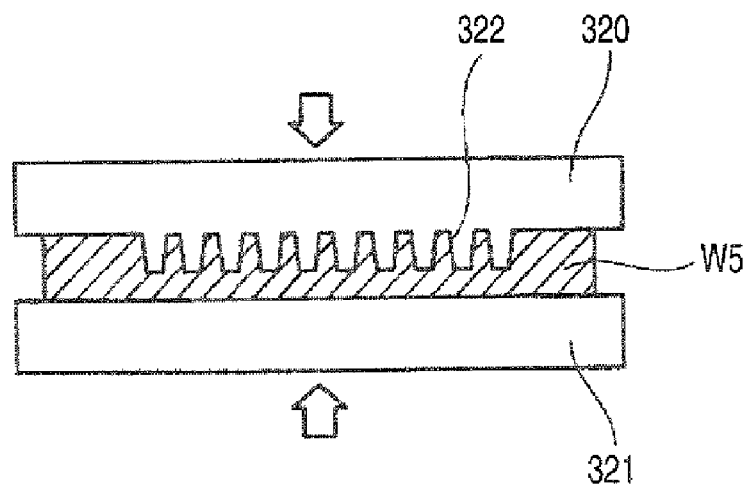
[FIG. 29]

A different embodiment of the invention is described below with reference the accompanying drawings. The toothed power transmission member is a rack of a rack-and-pinion type steering apparatus. First, a rack work is processed to a round bar, which has a predetermined diameter, by turning. Subsequently, as shown in FIG. 28, a bite is applied to this rack work W5 to process grooves 319 in a spiral shape. The spiral grooves 319 are densely cut by maintaining the lead angle at a small value. Subsequently, in a pressing step, as shown in FIG. 29, the rack work W5 is placed between molds 320 and 321 attached to an oil hydraulic press. Then, a ram is activated to thereby cause an oil pressure to act upon the molds 320 and 321. Thus, a gear tooth 322 is formed. In the case of this processing, the bottom portion of the spiral groove 319, which intersects with the tooth surface of the gear tooth 322 in the direction of a tooth trace, is left. Parts other than the bottom portion of the spiral groove 319 are formed as flat and smooth surfaces by plastic working.

Figure 30:
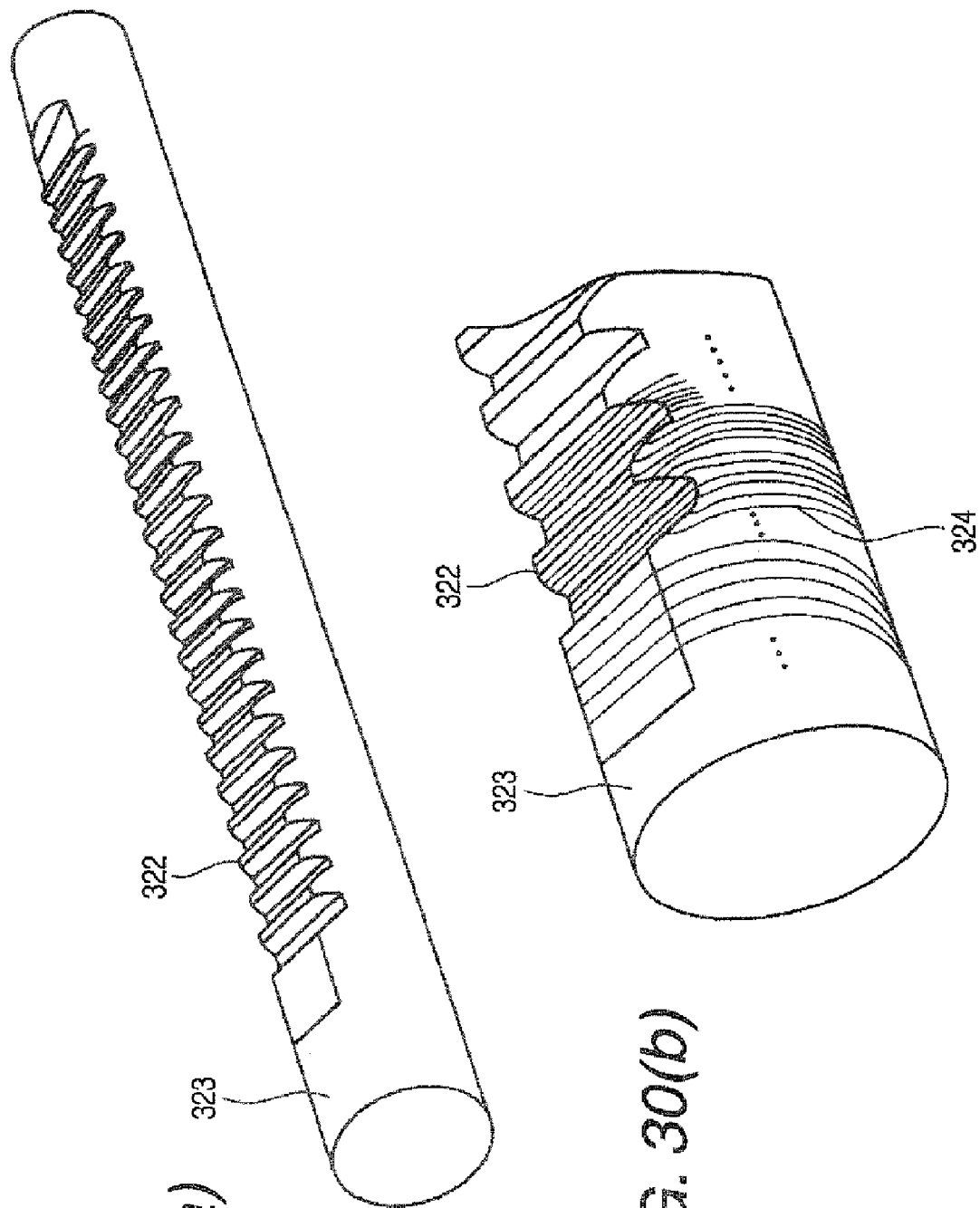
[FIG. 30]

Subsequently, a shaft portion other than the gear tooth is finished by machining. A rack 323 shown in FIGS. 30(a) and 30(b) can be obtained by performing the aforementioned steps. The bottom portion of the spiral groove 319 left in the tooth surface of the gear tooth 322 serves as an oil reservoir 324, which assists the fluid lubrication.

Thus, many oil reservoirs can efficiently be formed in time with the formation of the gear tooth, by cutting the spiral grooves or the linear grooves in the rack work, without groove processing.

Figure 31:
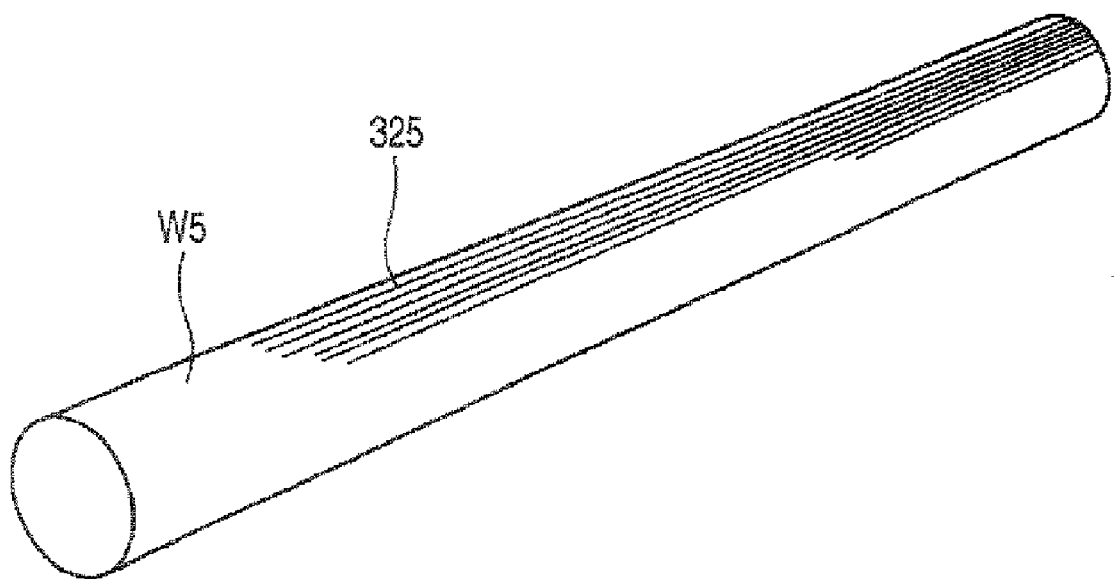
[FIG. 31]

Incidentally, this embodiment may be modified so that a groove 25 is cut in a direction intersecting with the direction of a tooth trace in a turning step, as shown in FIG. 31, and oil reservoirs are formed in the direction intersecting with the direction of the tooth trace, instead of forming the oil reservoir 324 in the direction of a tooth trace of the gear tooth 322 of the rack.

Also, a machine used to form the gear tooth is not limited to an oil hydraulic press. Therefore, any press such as a crank press may be used.

Figure 32:
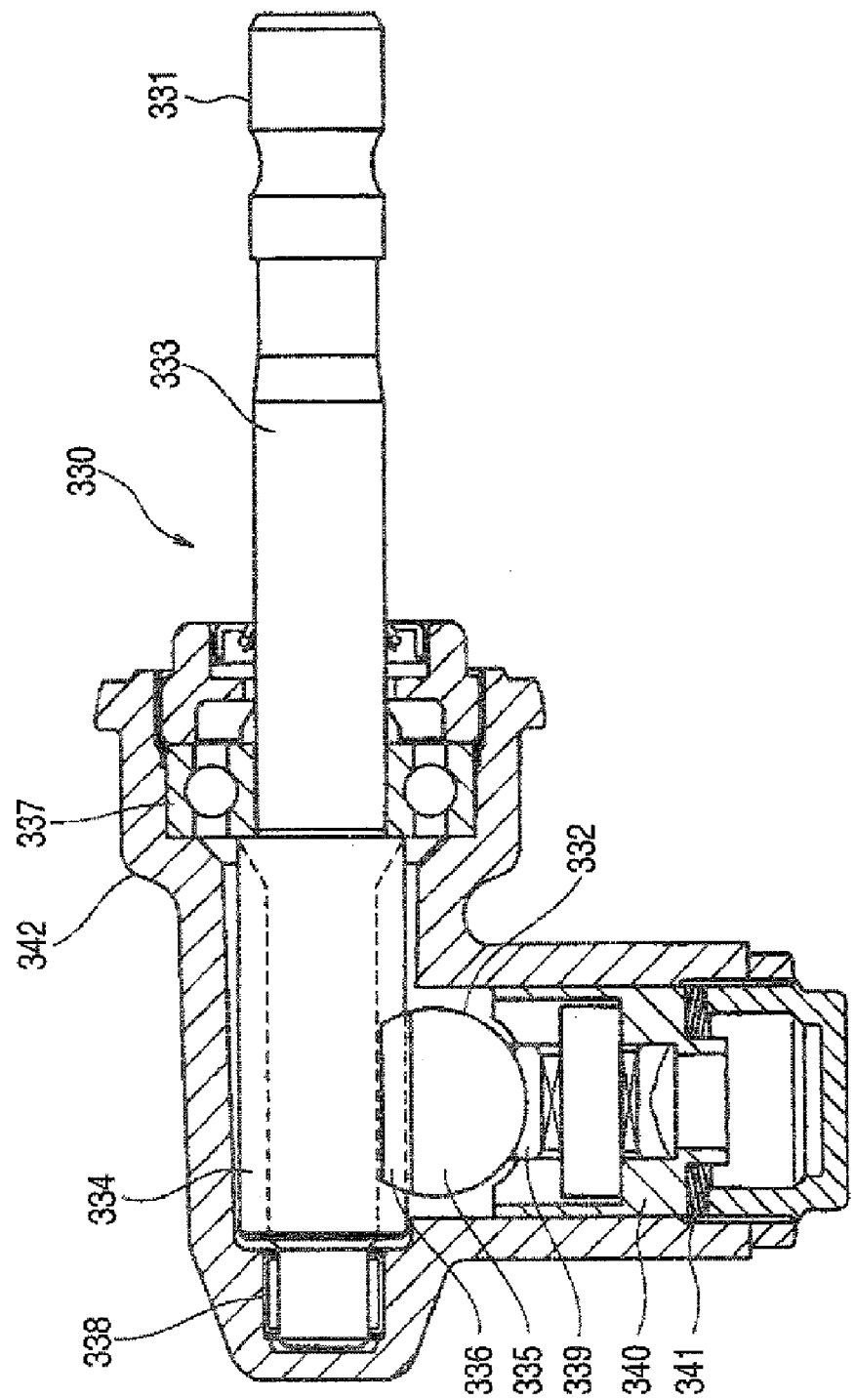
[FIG. 32]
Figure 33:
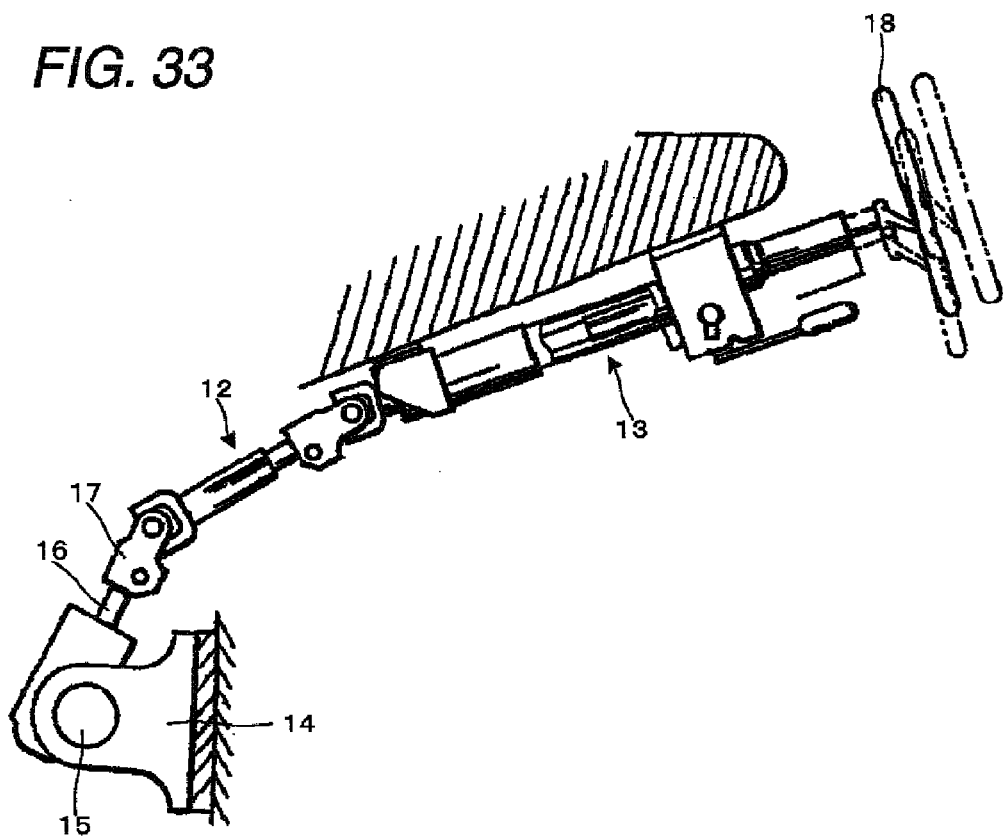
[FIG. 33]
Figure 34:
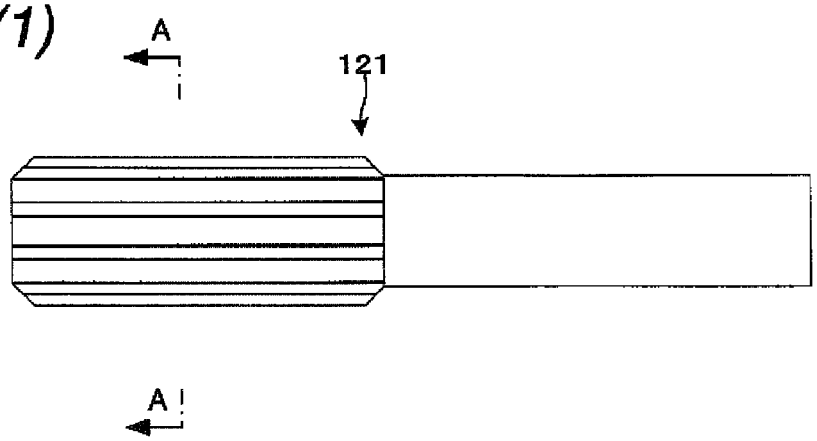
[FIG. 34]
Figure 34:
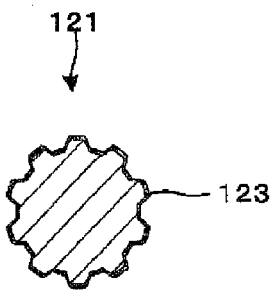

Preferably, the pinion and the rack manufactured by the method of the invention are constructed as a gear assembly to be incorporated into a steering apparatus. As shown in FIG. 32, a gear assembly includes a pinion 331 connected to a steering shaft (not shown) through a joint (not shown) and also includes a rack 332 disposed so that the centers of axes of the pinion and the rack intersect with each other, and that the gear teeth thereof mesh with those of the counterpart pinion 331.

The pinion 331 has many gear teeth 334 at one end of a shaft 333, which are threaded by plastic working according to the oil reservoir forming method according to the invention. The gear teeth 334 are involute teeth and have many oil reservoirs formed in a step according to the oil reservoir forming method of the invention. Also, the rack 332 has many gear teeth 336 in one surface of a rack shaft 335, which are threaded according to the oil reservoir forming method of the invention. The gear teeth 336 are involute teeth and have many oil reservoirs formed in the entire surface according to the oil reservoir forming method of the invention.

The pinion 331 is supported at an intermediate portion of the shaft 333 by a bearing 337. The farthest end of the shaft 333 is supported by a needle bearing 338. The rack shaft 335 abuts against a rack guide 339 that applies a back-pressure to the rack 332 at a side opposite to the gear teeth 336. This rack guide 339 is accommodated in a holder 340 adapted to slide in a direction perpendicular to the center of an axis of the rack. Also, the holder 340 abuts against a spring 341 adapted to axially generate a compressive load. The pinion 331 and the rack 332 are accommodated in a housing 342 together with components that support this pinion and this rack.

A lubricant, such as grease, is applied to the fabricated gear assembly 330 for fluid lubrication. This applied lubricant is stored in the oil reservoirs formed in the entirety of the tooth surfaces of the gear teeth 334 and 336. A large amount of the lubricant enables the gear assembly 330 to stably maintain fluid lubrication for a long term. Consequently, the wear of the gear teeth of the steering apparatus can significantly be reduced.

In any of the aforementioned embodiments, a shallow concave portion is formed on the surface of the teeth of the toothed power transmission member and serves as the oil reservoir. Lubricating oil is dispersed from the oil reservoir. Then, the oil reservoirs are randomly disposed, because the processing involves a plastic flow. However, the randomness of placement of the oil reservoirs does not cause a problem. Also, the combination of the aforementioned techniques disclosed in the description of the embodiment can be used.

Also, pinion gears, a worm gear, and so on of a power steering unit are assembled to places, the supply of a lubricant to which is difficult to achieve at periodical maintenance. Therefore, it is especially effective to form the oil reservoirs in the tooth surfaces. The method of the invention can effectively be employed in the manufacture of such toothed power transmission members. Also, the method of the invention can be used not only for the manufacture of the gears described in the description of the embodiments but other general toothed power transmission members having the oil reservoirs, such as male splines and a male screw whose lead angle is large.

Although the present invention has been described in detail and with reference to specific embodiments, it will be apparent to those skilled in the art that various changes and modifications can be made therein without departing from the spirit and scope thereof.

The present application is based on Japanese Patent Application No. 2004-345035 filed on Nov. 29, 2004, Japanese Patent Application No. 2005-017935 filed on Jan. 26, 2005, and Japanese Patent Application No. 2005-329232 filed on Nov. 14, 2005, the contents of which are incorporated herein by reference.

INDUSTRIAL APPLICABILITY

The manufacturing method according to the present invention can achieve the mass production of toothed power transmission members each having an oil reservoir, whose ability to hold a lubricating agent is enhanced, in the manufacture of the overall toothed power transmission members, without increasing a manufacturing cost so much.

The invention claimed is:

1. A method of manufacturing a toothed power transmission member having an oil reservoir, comprising steps of:
    forming a primitive concave portion, which form a basis for the oil reservoir, on a surface of a work; and
    forming a tooth surface of the toothed power transmission member by plastically deforming the work such that a trace of the primitive concave portion is left,
    wherein the trace of the primitive concave portion left on the toothed power transmission member serves as the oil reservoir.

2. The method of manufacturing a toothed power transmission member having an oil reservoir according to claim 1,
    wherein the step of forming a primitive concave portion includes a step of forming a primitive concave portion on a cylindrical surface of a bar-like work, and
    the step of forming a tooth surface includes a step of cold forging in which the bar-like work is pushed into a forging mold having a section whose shape is complementary to that of a desired toothed power transmission member.

3. The method of manufacturing a toothed power transmission member having an oil reservoir according to claim 2,
    wherein the primitive concave portion includes a spiral groove formed on the cylindrical surface of the bar-like work so as to form the oil reservoir in grooved shape.

4. The method of manufacturing a toothed power transmission member having an oil reservoir according to claim 2,
    wherein the primitive concave portion includes a plurality of annular grooves formed on the cylindrical surface of the bar-like work to so as to form the oil reservoirs in grooved shape.

5. The method of manufacturing a toothed power transmission member having an oil reservoir according to claim 2,
    wherein the primitive concave portion includes a plurality of longitudinal grooves formed along longitudinal direction on the cylindrical surface of the bar-like work so as to form the oil reservoir in grooved shape.

6. The method of manufacturing a toothed power transmission member having an oil reservoir according to claim 2,
    wherein the primitive concave portion formed on the cylindrical surface of the bar-like work includes a circular concave part so as to form the oil reservoir in a ponded shape.

7. The method of manufacturing a toothed power transmission member having an oil reservoir according to claim 1,
    wherein the step of forming a primitive concave portion includes a step of forming a circumferential primitive concave portion in an inner circumferential surface of a hollow cylindrical work, and
    the step of forming a tooth surface includes a step of forming a female spline by performing plastic working on the inner circumferential surface of the hollow cylindrical work where the primitive concave portion is formed.

8. The method of manufacturing a toothed power transmission member having an oil reservoir according to claim 7,
    wherein the primitive concave part includes a spiral groove.

9. The method of manufacturing a toothed power transmission member having an oil reservoir according to claim 8,
    wherein the spiral groove is formed by rolling.

10. The method of manufacturing a toothed power transmission member having an oil reservoir according to claim 7,
    wherein the primitive concave part includes a plurality of annular grooves.

11. The method of manufacturing a toothed power transmission member having an oil reservoir according to claim 7,
    wherein the primitive concave portion is formed by rolling.

12. The method of manufacturing a toothed power transmission member having an oil reservoir according to claim 1,
    wherein the primitive concave portion includes a spiral groove or a linear groove, and
    the step of forming a tooth surface includes a step of forming a tooth such that a bottom portion of the spiral groove or the linear groove is left on the work in a region that includes the spiral groove or the linear groove.

13. The method of manufacturing a toothed power transmission member having an oil reservoir according to claim 1,
    wherein the primitive concave portion includes a spiral groove or a linear groove, and
    the step of forming a tooth surface includes a step of forming a screw thread or a screw shaft such that a bottom portion of the spiral groove or the linear groove is left on the work in a region that includes the spiral groove or the linear groove.

14. The method of manufacturing a toothed power transmission member having an oil reservoir according to claim 1,
    wherein the toothed power transmission member includes a pinion,
    the step of forming a primitive concave portion includes a step of forming a spiral groove on a pinion work, and
    the step of forming a tooth surface includes a step of forming a gear tooth by plastic working such that a bottom portion of the groove is left on the pinion work in a region that includes the spiral groove, further wherein the method of manufacturing a toothed power transmission member having an oil reservoir further comprises a step of finishing the forming of toothed power transmission member by machining.

15. The method of manufacturing a toothed power transmission member having an oil reservoir according to claim 1, wherein the toothed power transmission member includes a rack, the step of forming a primitive concave portion includes a step of forming a spiral groove on a rack work, and the step of forming a tooth surface includes a step of forming a gear tooth by plastic working such that a bottom portion of the groove is left on the rack work in a region that includes the spiral groove, further wherein the method of manufacturing a toothed power transmission member having an oil reservoir further comprises a step of finishing the forming of toothed power transmission member by machining.

\* \* \* \* \*